(12) United States Patent
Maeda

(10) Patent No.: US 10,754,602 B2
(45) Date of Patent: Aug. 25, 2020

(54) PRINTING APPARATUS THAT EXECUTES PRINT JOB, CONTROL METHOD THEREFOR, AND STORAGE MEDIUM

(71) Applicant: CANON KABUSHIKI KAISHA, Tokyo (JP)

(72) Inventor: Ryo Maeda, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/244,376

(22) Filed: Jan. 10, 2019

(65) Prior Publication Data

US 2019/0220237 A1 Jul. 18, 2019

(30) Foreign Application Priority Data

Jan. 15, 2018 (JP) ................................. 2018-004349

(51) Int. Cl.
*G06F 3/12* (2006.01)
*H04N 1/00* (2006.01)

(52) U.S. Cl.
CPC .......... *G06F 3/1273* (2013.01); *G06F 3/1204* (2013.01); *G06F 3/1218* (2013.01); *G06F 3/1253* (2013.01); *G06F 3/1257* (2013.01); *G06F 3/1267* (2013.01); *G06F 3/1285* (2013.01); *H04N 1/00347* (2013.01); *G06F 3/1258* (2013.01); *H04N 2201/0087* (2013.01); *H04N 2201/3242* (2013.01); *H04N 2201/3277* (2013.01)

(58) Field of Classification Search
CPC .............................. G06F 3/1273; G06F 3/1204
See application file for complete search history.

(56) References Cited

U.S. PATENT DOCUMENTS

| 8,422,045 | B2 | 4/2013 | Yamada | |
|---|---|---|---|---|
| 2010/0128309 | A1* | 5/2010 | Matoba | G06K 15/005 358/1.15 |
| 2010/0235499 | A1* | 9/2010 | Maki | H04N 1/32122 709/224 |
| 2012/0133976 | A1* | 5/2012 | Tadokoro | G06F 3/1207 358/1.15 |

(Continued)

FOREIGN PATENT DOCUMENTS

JP 2008087177 A 4/2008

OTHER PUBLICATIONS

Extended European Search Report issued in European Application No. 19151554.3 dated Apr. 5, 2019.

*Primary Examiner* — Ibrahim Siddo
(74) *Attorney, Agent, or Firm* — Rossi, Kimms & McDowell LLP

(57) ABSTRACT

A printing apparatus which is capable of easily issuing an instruction to execute a print job in another file stored at the same storage location without the need to perform a complicated registration operation. The printing apparatus executes a job for printing data based on print settings received from a user. The printing apparatus stores print settings of the job and information indicating a storage location of data printed through execution of the job as a history. The printing apparatus display a selection screen in which a user selects data to be printed from data stored at the storage location when reading the print settings stored.

15 Claims, 31 Drawing Sheets

(56) References Cited

U.S. PATENT DOCUMENTS

| | | | | |
|---|---|---|---|---|
| 2012/0154858 A1* | 6/2012 | Sato | ................... | G06F 17/2294 |
| | | | | 358/1.15 |
| 2014/0310323 A1* | 10/2014 | Nakajima | ............... | G06F 16/13 |
| | | | | 707/823 |
| 2015/0213039 A1* | 7/2015 | Kadoda | ................ | G06F 16/168 |
| | | | | 707/822 |

* cited by examiner

FIG. 4

| USER ID 401 | USER NAME 402 | DOMAIN NAME 403 | PASSWORD 404 | E-MAIL ADDRESS 405 | ADMINISTRATOR RIGHT 406 |
|---|---|---|---|---|---|
| 00001 | tanaka | – | 012345 | tanaka@abc.co.jp | FALSE |
| 00002 | yamada | – | 999999 | yamada@abc.co.jp | FALSE |
| 00003 | shimizu | CANAN | 987654 | shimizu@canan.com | TRUE |
| 00004 | sato | – | aaaaaa | sato@abc.co.jp | FALSE |

🏠 📄 USE SAVED FILE ⚙️

SELECT AND PRINT FILE.
901 — /MINUTES OF MEETING/

| TYPE | NAME | SHEET SIZE | NUMBER OF PAGES | DATE |
|---|---|---|---|---|
| PDF | 0302.pdf | A4 | 1 | 03/02 15:21 |
| PDF | 0304.pdf | A4 | 3 | 03/04 19:33 |
| JPG | WHITE BOARD.jpg | B4 | 1 | 03/27 12:31 |
| PDF | 0401.pdf | A4 | 2 | 04/01 13:55 |

902 — (table)
905 — (highlighted row)
903 — ▲▼

[ CANCEL ]  904            [ PRINT ] 906

🏠 📄 USE SAVED FILE ⚙️

NUMBER OF SELECTIONS : 1

| FULL COLOR | A4 | 1 |

[ SELECT COLOR ]  [ SELECT SHEET ]

[ SORT / FINISH ]  [ ONE-SIDED / DOUBLE-SIDED ]  [ OTHER FUNCTIONS ▶ ]

☐ RESET TO ORIGINAL SETTINGS
FREQUENTLY USED SETTINGS ▶
☐ DELETE FILE AFTER PRINTING
☐ RESET TO DEFAULT SETTINGS

[ CANCEL ] 908            [ START PRINTING ] 909

FIG. 14

| 1401 CUSTOM BUTTON ID | 1402 BUTTON TYPE | 1403 OWNER USER ID | 1404 BUTTON NAME | 1405 APPLICATION TYPE | 1406 UPDATE DATE | 1407 APPLICATION DATA | 1408 CONFIRMATION SETTING | 1409 IMMEDIATE EXECUTION SETTING |
|---|---|---|---|---|---|---|---|---|
| 1 | SHARED BUTTON | — | WRITTEN OATH 2 COPIES, MONOCHROME, ONE-SIDED | COPY | 2016/12/15 13:01:22 | COLOR MODE/MONOCHROME SHEET SIZE/A4 PAGE AGGREGATION/1 in 1 ZOOM RATE/125% NUMBER OF COPIES/2 DOUBLE-SIDED/DOUBLE-SIDED | ON | OFF |
| 2 | SHARED BUTTON | — | SAVE MINUTES OF MEETING | SCAN AND SAVE | 2017/01/03 11:11:43 | FOLDER PATH/"/folder/abc" FILE NAME/ "MINUTES OF MEETING.pdf" COLOR MODE/FULL COLOR SHEET SIZE/A4 ZOOM RATE/100% | ON | ON |
| 3 | MY BUTTON | 00002 | SEND QUOTE | SCAN AND SEND | 2017/01/15 08:33:25 | DESTINATION ADDRESS/ "yamada@abc.co.jp" FILE NAME/"QUOTE.pdf" COLOR MODE/AUTO SHEET SIZE/A3 ZOOM RATE/100% | OFF | OFF |
| 4 | MY BUTTON | 00001 | REQUEST SHEET | COPY | 2017/01/24 17:09:00 | COLOR MODE/MONOCHROME SHEET SIZE/B5 PAGE AGGREGATION/2 in 1 ZOOM RATE/100% NUMBER OF COPIES/1 DOUBLE-SIDED/ONE-SIDED | OFF | ON |

| CUSTOM BUTTON ID | BUTTON TYPE | OWNER USER ID | BUTTON NAME | APPLICATION TYPE | UPDATE DATE | APPLICATION DATA | CONFIRMATION SETTING | IMMEDIATE EXECUTION SETTING |
|---|---|---|---|---|---|---|---|---|
| 5 | SHARED BUTTON | — | AUTHORIZATION SHEET | COPY | 2017/03/14 07:29:30 | COLOR MODE/MONOCHROME SHEET SIZE/B4 FINISH/PUNCH ZOOM RATE/144% NUMBER OF COPIES/2 DOUBLE-SIDED/DOUBLE-SIDED | OFF | OFF |

| CUSTOM BUTTON ID | BUTTON TYPE | OWNER USER ID | BUTTON NAME | APPLICATION TYPE | UPDATE DATE | APPLICATION DATA | CONFIRMATION SETTING | IMMEDIATE EXECUTION SETTING |
|---|---|---|---|---|---|---|---|---|
| | | | | | | 1407 | 1408 | 1409 |
| 1 | SHARED BUTTON | - | WRITTEN OATH 2 COPIES, MONOCHROME, ONE-SIDED | COPY | 2016/12/15 13:01:22 | COLOR MODE/ MONOCHROME SHEET SIZE/A4 PAGE AGGREGATION/1 in 1 ZOOM RATE/125% NUMBER OF COPIES/2 DOUBLE-SIDED/ DOUBLE-SIDED | ON | OFF |

| 2401 | 2402 | 2403 | 2404 | 2405 | 2406 | 2407 | 2408 |
|---|---|---|---|---|---|---|---|
| RECORD ID | RECORD TYPE | OWNER USER ID | RECORD NAME | APPLICATION TYPE | UPDATE DATE | APPLICATION DATA | SCREEN TRANSITION SETTING |
| 1 | SHARED RECORD | – | MONOCHROME A4 125% | COPY | 2016/11/25 03:51:22 | COLOR MODE/MONOCHROME SHEET SIZE/A4 PAGE AGGREGATION/1 in 1 ZOOM RATE/125% NUMBER OF COPIES/2 DOUBLE-SIDED/DOUBLE-SIDED | JOB SETTING SCREEN |
| 2 | MY RECORD | 00001 | /folder/abc/ MINUTES OF MEETING.pdf | USE SAVED FILE | 2017/03/04 09:11:43 | FOLDER PATH/"/folder/abc" FILE NAME/ "MINUTES OF MEETING.pdf" COLOR MODE/ FULL COLOR SHEET SIZE/A4 ZOOM RATE/100% | FILE SELECTION SCREEN |
| 3 | MY RECORD | 00002 | /folder/abc/ QUOTE.pdf | USE SAVED FILE | 2017/03/02 12:23:05 | FOLDER PATH/"/folder/abc" FILE NAME/"QUOTE.pdf" COLOR MODE/MONOCHROME SHEET SIZE/A3 ZOOM RATE/100% | JOB SETTING SCREEN |
| 4 | MY RECORD | 00003 | MONOCHROME B5 2in1 | COPY | 2017/02/24 15:29:50 | COLOR MODE/MONOCHROME SHEET SIZE/B5 PAGE AGGREGATION/2 in 1 ZOOM RATE/100% NUMBER OF COPIES/1 DOUBLE-SIDED/ONE-SIDED | JOB SETTING SCREEN |

| RECORD ID | RECORD TYPE | OWNER USER ID | RECORD NAME | APPLICATION TYPE | UPDATE DATE | APPLICATION DATA | SCREEN TRANSITION SETTING |
|---|---|---|---|---|---|---|---|
| 5 | MY RECORD | 00001 | /MINUTES OF MEETING/ 0304.pdf | USE SAVED FILE | 2017/05/27 19:13:13 | FOLDER PATH/"/ MINUTES OF MEETING" FILE NAME/"0304.pdf" COLOR MODE/FULL COLOR SHEET SIZE/A4 FINISH/SORT DOUBLE-SIDED/ONE-SIDED | FILE SELECTION SCREEN |

| RECORD ID | RECORD TYPE | OWNER USER ID | RECORD NAME | APPLICATION TYPE | UPDATE DATE | APPLICATION DATA 2407 | SCREEN TRANSITION SETTING 2408 |
|---|---|---|---|---|---|---|---|
| 2 | MY RECORD | 00001 | /folder/abc/ MINUTES OF MEETING.pdf | USE SAVED FILE | 2017/03/04 09:11:43 | FOLDER PATH/"/folder/abc" FILE NAME/ "MINUTES OF MEETING.pdf" COLOR MODE/FULL COLOR SHEET SIZE/A4 ZOOM RATE/100% | FILE SELECTION SCREEN |

USE SAVED FILE

SELECT AND PRINT FILE.
/folder/abc/

| TYPE | NAME | SHEET SIZE | NUMBER OF PAGES | DATE |
|---|---|---|---|---|
| FOLDER | 2017_03_05 | | | |
| PDF | MINUTES OF MEETING.pdf | A4 | 5 | 03/04 09:11 |
| JPG | BACKGROUND.jpg | A4 | 1 | 05/27 12:31 |
| PDF | CONTRACT SHEET.pdf | A3 | 25 | 06/01 13:55 |

CANCEL   PRINT

USE SAVED FILE

NUMBER OF SELECTIONS : 1

| FULL COLOR | A4 | 1 |

SELECT COLOR   SELECT SHEET

SORT / FINISH   ONE-SIDED / DOUBLE-SIDED   OTHER FUNCTIONS

RESET TO ORIGINAL SETTINGS

FREQUENTLY USED SETTINGS

DELETE FILE AFTER PRINTING

RESET TO DEFAULT SETTINGS

CANCEL   START PRINTING

3003

PRINTING APPARATUS THAT EXECUTES PRINT JOB, CONTROL METHOD THEREFOR, AND STORAGE MEDIUM

BACKGROUND OF THE INVENTION

Field of the Invention

The present invention relates to a printing apparatus, a control method therefor, and a storage medium.

Description of the Related Art

An MFP which is a printing apparatus executing a print job in accordance with an executing instruction issued by a user is known. When instructing the MFP to execute a print job, the user determines execution conditions for the print job, for example, print settings such as a designation of a document file (hereafter referred to as a "file") to be printed, a sheet size, and the number of copies. To designate a file stored in one folder in the MFP as an object to be printed, the user designates the one folder and designates a desired file from all files stored in the one folder.

In general, the MFP is shared by a plurality of users. For this reason, in the MFP, when a predetermined time period has elapsed, the execution conditions are automatically cleared so as to prevent other users from using the execution conditions without noticing. In this usage pattern, the user needs to set execution conditions whenever he or she performs printing on the same execution conditions, and this is inconvenient. Accordingly, a custom button registration function has conventionally been used. The user registers a custom button, with which desired execution conditions are associated, in the MFP in advance. When the user selects the custom button displayed on an operating unit of the MFP, an operating screen on which the execution conditions associated with the custom button have been set is displayed on the operating unit of the MFP. This enables the user to easily issue an executing instruction when performing printing on the same execution conditions. However, in a case where the custom button registration function is used, the user needs to perform a complicated registration operation, which takes a lot of time and effort. Accordingly, a reprint function has conventionally been used. With the reprint function, the same settings are used based on setting histories of print jobs executed in the past, and more specifically, the same file is printed with the same print settings (see, Japanese Laid-Open Patent Publication (Kokai) No. 2008-87177). This enables the user to easily issue an executing instruction based on execution conditions set in the past without performing the complicated registration operation.

With the reprint function described above, however, when issuing an instruction to execute a print job for which a part of execution conditions set in the past has been changed, for example, a print job in which another file stored in the same folder is printed, the user needs to start over by designating a folder. For this reason, the user cannot easily issue an instruction to execute a print job for another file stored at the same storage location.

SUMMARY OF THE INVENTION

The present invention provides a printing apparatus and a control method therefor, which are capable of easily issuing an instruction to execute a print job in another file stored at the same storage location without the need to perform complicated registration operations, as well as a storage medium.

Accordingly, the present invention provides a printing apparatus that executes a job for printing data based on print settings received from a user, comprising a storage unit configured to store print settings of the job and information indicating a storage location of data printed through execution of the job as a history, and a display unit configured to display a selection screen in which a user selects data to be printed from data stored at the storage location when reading the print settings stored by the storage unit.

According to the present invention, an instruction to execute a print job in another file stored at the same storage location is easily issued without the need to perform complicated registration operations.

Further features of the present invention will become apparent from the following description of exemplary embodiments (with reference to the attached drawings).

BRIEF DESCRIPTION OF THE DRAWINGS

FIG. 4 is a view showing an example of a user information DB which is managed by the MFP in FIG. 1.

FIGS. 9A and 9B are views showing examples of an application screen which is displayed on the touch panel in FIG. 2.

FIG. 14 is a view showing an example of custom button information which is managed by the MFP in FIG. 1.

FIG. 15 is a view showing an example of custom button-related information which is generated by the process in FIG. 10.

FIG. 18 is a view showing an example of custom button-related information which is used in the process in FIG. 17.

FIG. 24 is a view showing an example of record information which is managed by the MFP in FIG. 1.

FIG. 25 is a view showing an example of a setting history which is generated by the process in FIG. 22.

FIG. 29 is a view showing an example of a setting history which is used in the process in FIG. 28.

FIGS. 30A and 30B are views showing examples of an application screen which is displayed on the touch panel in FIG. 2.

DESCRIPTION OF THE EMBODIMENTS

An embodiment of the present invention will now be described in detail with reference to the accompanying drawings.

Figure 1:
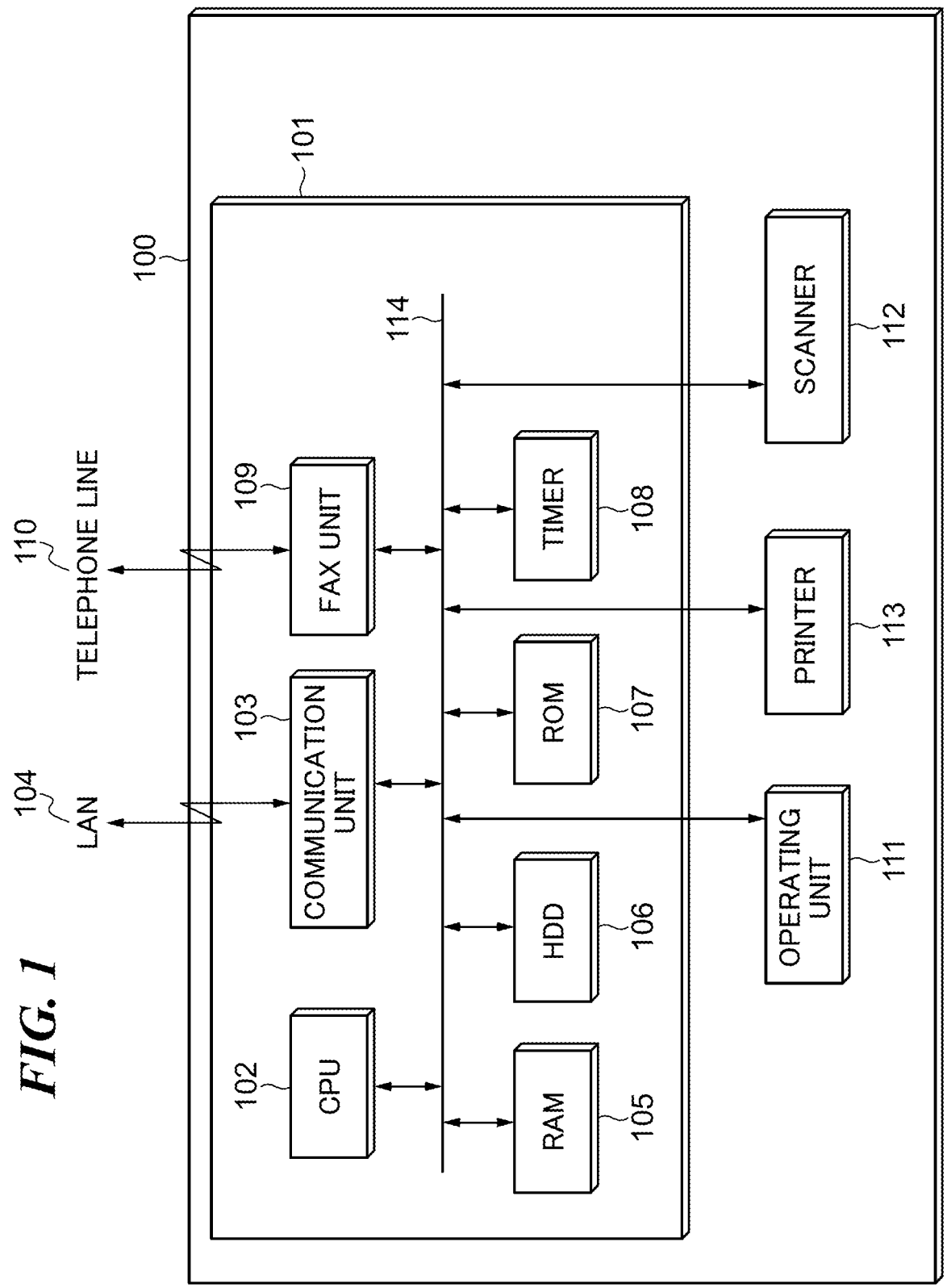
FIG. 1 is a block diagram schematically showing an arrangement of an MFP which is a printing apparatus according to an embodiment of the present invention.

FIG. 1 is a block diagram schematically showing an arrangement of an MFP 100 which is a printing apparatus according to the embodiment of the present invention.

Referring to FIG. 1, the MFP 100 has a controller unit 101, an operating unit 111, a scanner 112, and a printer 113 as units. The controller unit 101 is connected to the operating unit 111, the scanner 112, and the printer 113. The controller unit 101 has a CPU 102, a communication unit 103, a RAM 105, an HDD 106, a ROM 107, a timer 108, and a fax unit 109. The CPU 102, the communication unit 103, the RAM 105, the HDD 106, the ROM 107, the timer 108, and the fax unit 109 are connected to one another via a system bus 114.

The MFP 100 has a plurality of functions such as a copying function, a scanning function, a printing function, a fax communication function, and an authentication function. The MFP 100 uses these functions to execute jobs. The MFP 100 is able to expand its functions by additionally installing applications from outside the MFP 100 via the communication unit 103. The control unit 101 controls operation of the units connected thereto. The CPU 102 controls the entire control unit 101. The communication unit 103 sends and receives data to and from an external apparatus (not shown) via the LAN 104. The LAN 104 is a network for the MFP 100 to send and receive data to and from the external apparatus. The MFP 100 is connected to an internet via the LAN 104. The RAM 105 is used as system work memory for the CPU 102. The HDD 106 is a hard disk drive. The HDD 106 is a storage medium such as a magnetic disk, an optical medium, or a flash memory. The HDD 106 stores files, setting data, programs, and so forth. It should be noted that in the present embodiment, the HDD 106 may not be incorporated in the MFP 100, but for example, a storage of a server or PC, not shown, may be used as an alternative to the HDD 106 via the communication unit 103.

The ROM 107, which is a boot ROM, stores a system boot program. The CPU 102 expands programs stored in the HDD 106 and the ROM 107 into the RAM 105 and provides various types of control based on the expanded programs. The timer 108 starts measuring the amount of time in accordance with an instruction from the CPU 102. When a time period designated in advance has elapsed since the timer 108 started measuring the amount of time, the timer 108 sends an interruption notification to the CPU 102. The fax unit 109 sends and receives fax data to and from the external apparatus, which is capable of carrying out facsimile communications, via a telephone line 110.

Figure 2:
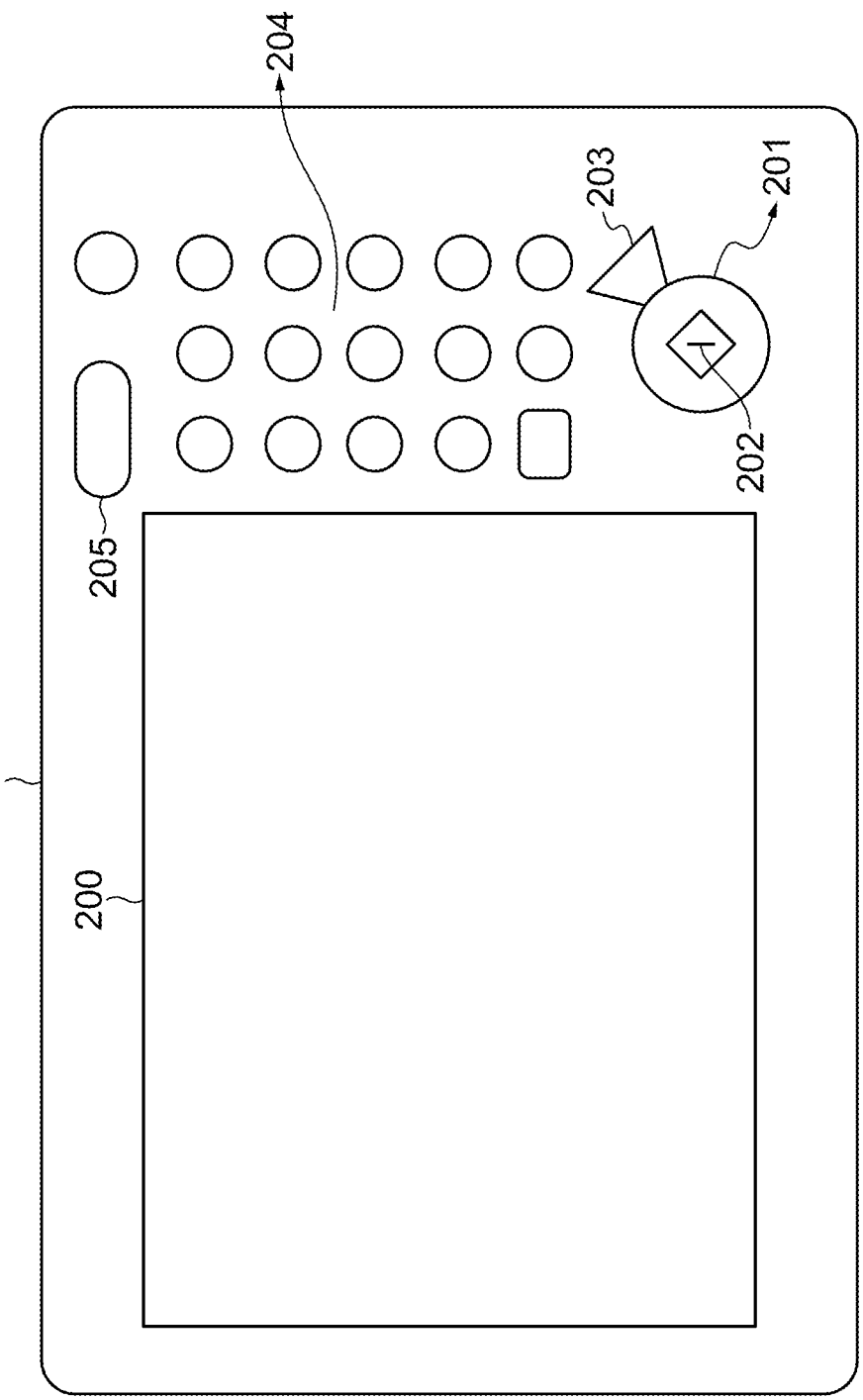
FIG. 2 is an external view of an operating unit in FIG. 1.
Figure 6:
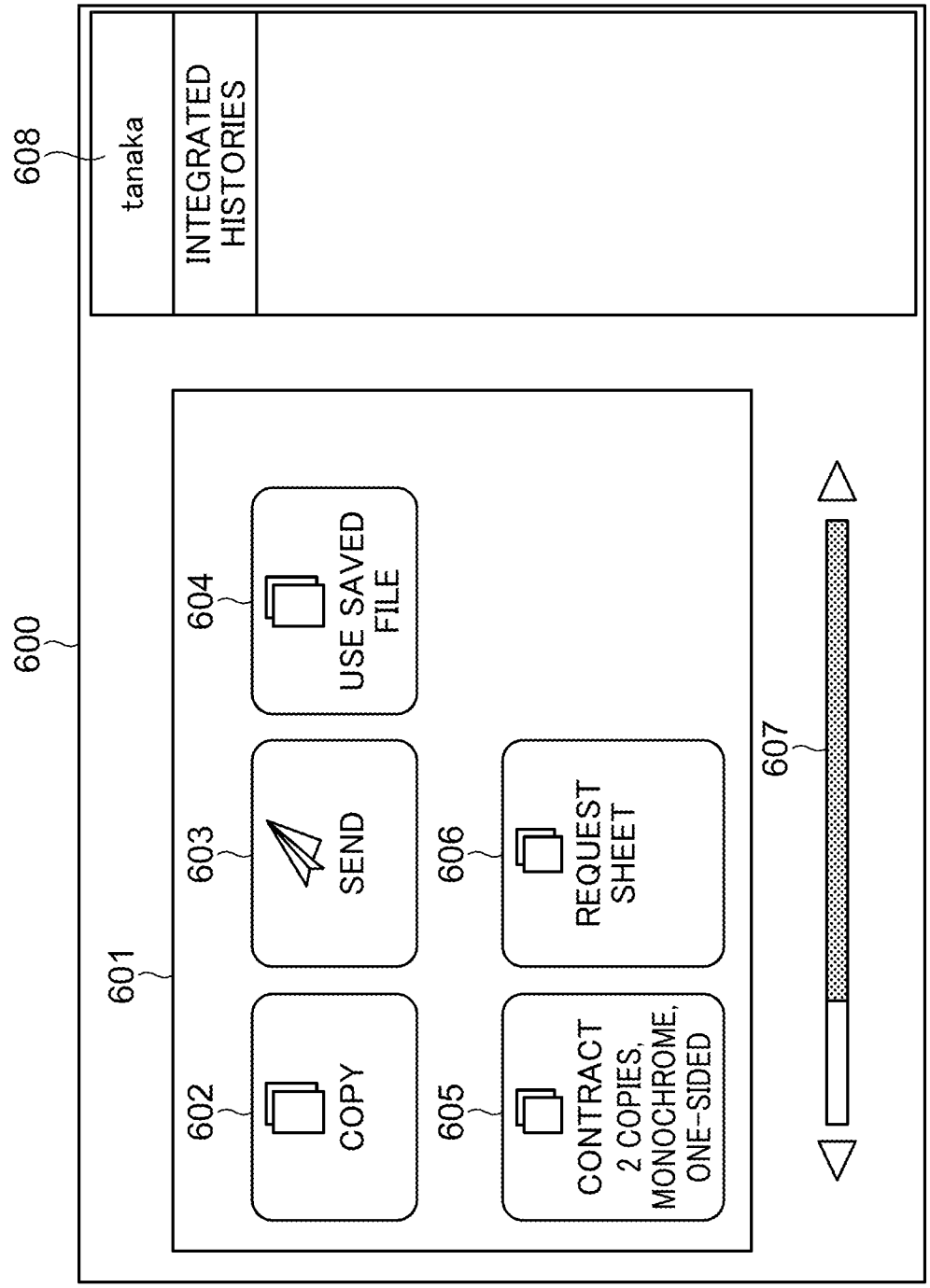
FIG. 6 is a view showing an example of a home screen which is displayed on the touch panel in FIG. 2.

The operating unit 111 displays a variety of information about the MFP 100 and also receives a job executing instruction, a setting changing instruction, and so forth from a user. As shown in FIG. 2, the operating unit 111 has a touch panel 200, a start key 201, an LED 202, a stop key 203, a numeric keypad 204, and a home key 205. The touch panel 200 is a liquid crystal display, and a surface of its liquid crystal is covered with a touch panel sheet. The touch panel 200 displays an operating screen and a software keypad. When the user depresses the software keypad displayed on the touch panel 200, the operating unit 111 sends positional information indicating a depressed position to the CPU 102. The start key 201 is used when, for example, the user issues an instruction to start reading an original. A central area of the start key 201 is comprised of LEDs 202 of two colors i.e. green and red. In the present embodiment, the color that lights up indicates whether or not the start key 201 is allowed to be used. The stop key 203 is used when, for example, the user issues an instruction to stop an operation being performed. The numeric keypad 204 is comprised of numeral and character buttons. The numeric keypad 204 is used when, for example, the user sets the number of copies and issues an instruction to switch screens on the touch panel 200. The home key 205 is used to, for example, display a home screen 600 in FIG. 6, to be described later, on the touch panel 200. It should be noted that the operating buttons such as the start key 201, the stop key 203, the numeric keypad 204, and the home key 205 are examples, and the operating unit 111 may be equipped with other operating buttons as well as the above operating buttons. The above operating keys may be placed as software buttons on the touch panel 200.

The scanner 112 scans a placed original and generates image data by digitalizing an image on the original and then stores the generated image data in the RAM 105 or the HDD 106. The printer 113 prints files and others stored in the RAM 105 and the HDD 106.

Figure 3:
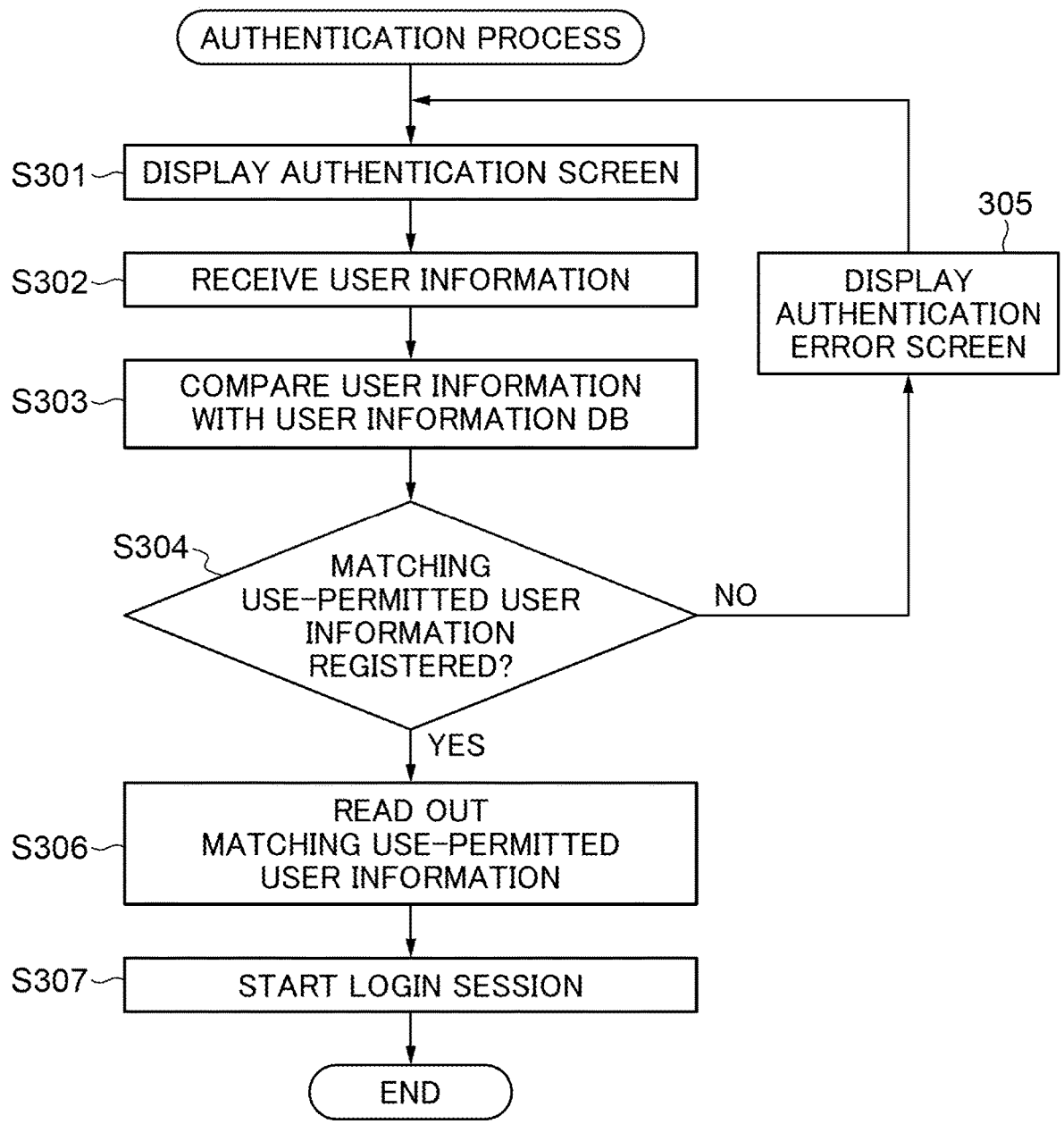
FIG. 3 is a flowchart showing the procedure of an authentication process which is carried out by a CPU in FIG. 1.

FIG. 3 is a flowchart showing the procedure of an authentication process which is carried out by the CPU 102 in FIG. 1. The process in FIG. 3 is implemented by the CPU 102 executing programs in the ROM 107 or the like. The process in FIG. 3 is carried out when, for example, an authentication request issued by a user is received via the operating unit 111. The process in FIG. 3 is based on the assumption that information about the user permitted to use the MFP 100 (hereafter referred to as "the use permitted user information") was registered in advance. In the MFP 100, the use permitted user information is managed by a user information DB 400 in FIG. 4 stored in the HDD 106. The user information DB 400 includes user IDs 401, user names 402, domain names 403, passwords 404, e-mail addresses 405, and administrator rights 406. Identifiers uniquely assigned to respective registered users are set as the user IDs 401. User names of the respective registered users are set as the user names 402. Domain names of the respective registered users are set as the domain names 403. Passwords associated with the respective registered users are set as the passwords 404. E-mail addresses of the respective registered users are set as the e-mail addresses 405. Information as to whether or not the registered users have administrator rights for the MFP 100 is set as the administrator rights 406.

Figure 5:
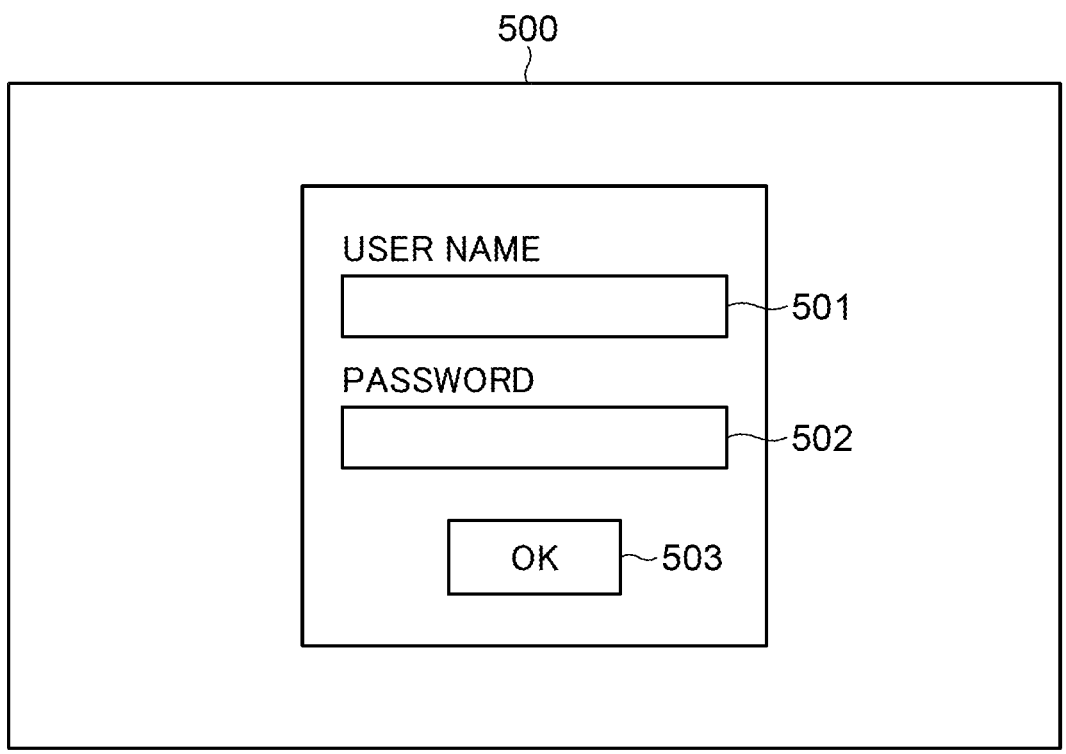
FIG. 5 is a view showing an example of an authentication screen which is displayed on a touch panel in FIG. 2.

Referring to FIG. 3, first, the CPU 102 displays an authentication screen 500 in FIG. 5 on the touch panel 200 (step S301). The authentication screen 500 has a user name input field 501, a password input field 502, and an OK button 503. When a user enters user information into the input fields and depresses the OK button 503, the CPU 102 receives the user information (step S302). Next, the CPU 102 compares the user information with the user information DB 400 (step S303). The CPU 102 determines whether or not use permitted user information including the user name 402 and the password 404 matching the user information (hereafter referred to as "matching use permitted user information") is registered in the user information DB 400 (step S304).

As a result of the determination in the step S304, when the matching use permitted user information is not registered in the user information DB 400, the CPU 102 displays an authentication error screen (not shown) on the touch panel 200 (step S305), followed by the process returning to the step S301.

As a result of the determination in the step S304, when the matching use permitted user information is registered in the user information DB 400, the CPU 102 reads out the matching use permitted user information from the user information DB 400 (step S306). Then, the CPU 102 starts a login session (step S307). This enables the user to use the functions of the MFP 100. After that, the CPU 102 ends the present process.

Figure 8:
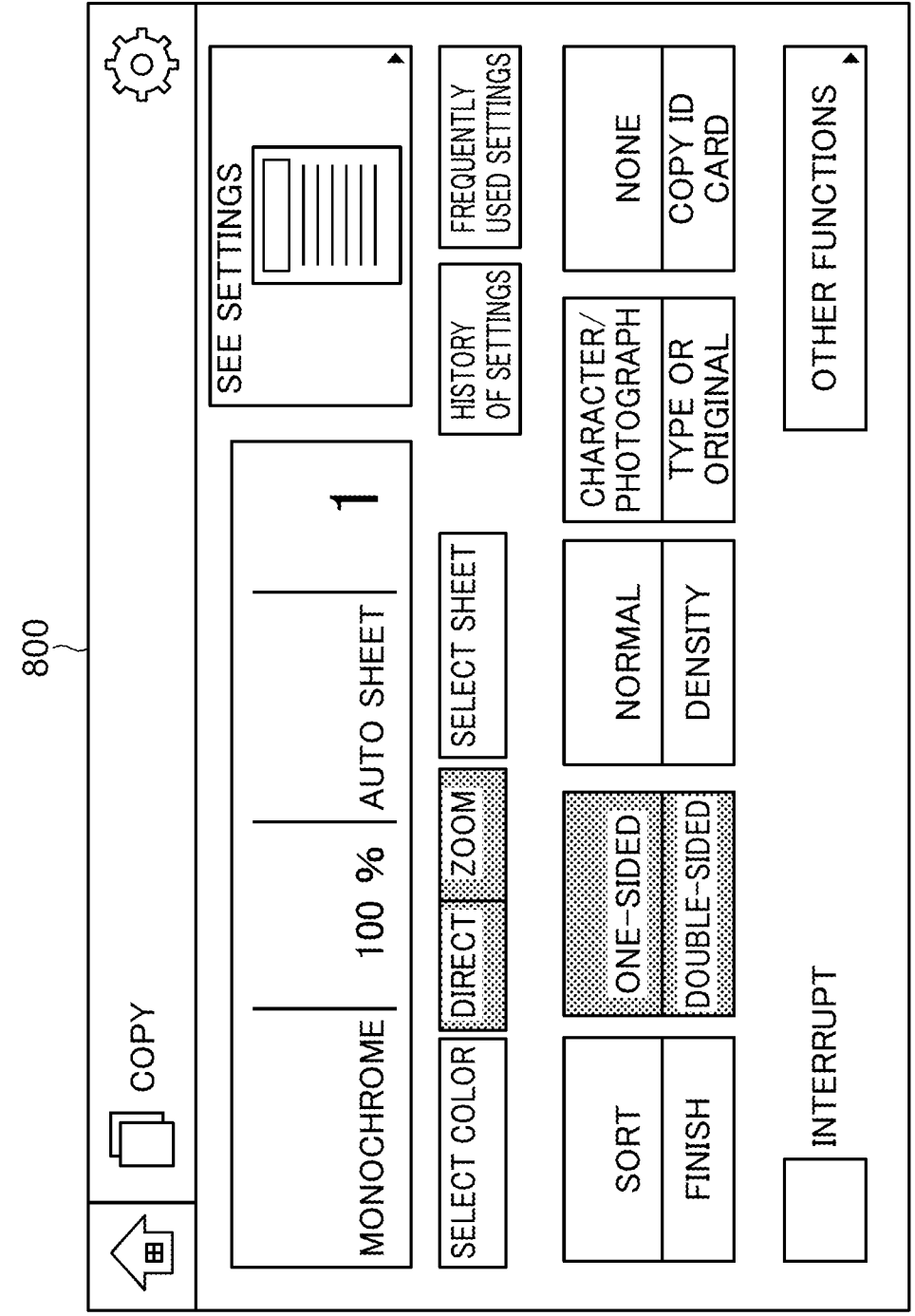
FIG. 8 is a view showing an example of a copy setting screen which is displayed on the touch panel in FIG. 2.

Applications which are programs of software controlling the installed functions such as a copying application and a saved file using application are stored in the HDD 106 of the MFP 100. The copying application converts image data, which is obtained by the scanner 112 scanning an original, into printing data. The copying application also prints the printing data with the printer 113 based on execution conditions set on a copy setting screen 800 in FIG. 8, to be described later. The saved file using application converts a file designated by the user into printing data based on execution conditions set on a file selection screen 900 in FIG. 9A and a print setting screen 907 in FIG. 9B, to be described later. The saved file using application also prints the printing data with the printer 113. The user who has logged in the MFP 100 is permitted to operate the home screen 600 in FIG. 6 to set execution conditions for jobs to be executed by the applications.

The home screen 600 is a screen for calling screens on which execution conditions for jobs to be executed by each application are set (hereafter referred to as "application screen"). The home screen 600 has a menu 601, a slide bar 607, and a user name display area 608. App buttons 602 to 604 for the respective applications and custom buttons 605 and 606 are displayed in the menu 601. The menu 601 is comprised of one or more screens. The number of buttons is determined by a button layout setting (not shown) stored in the HDD 106.

Figure 7:
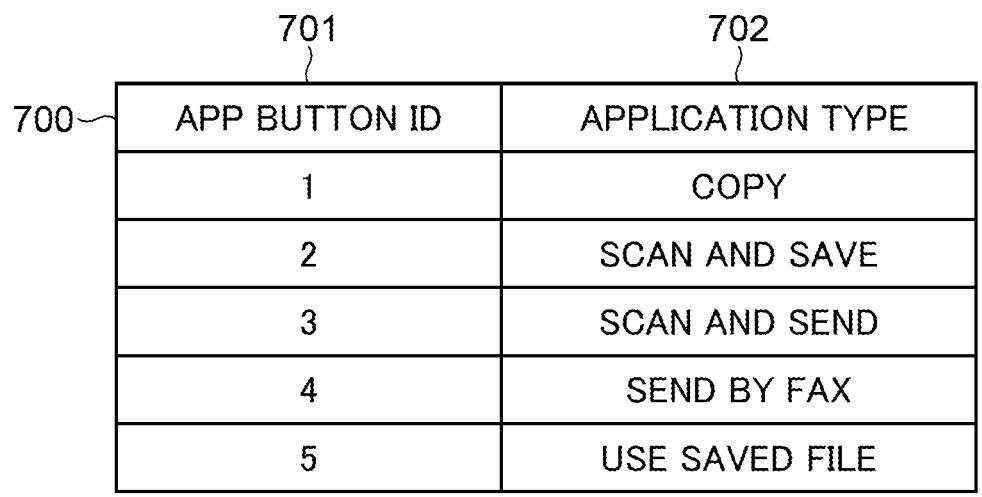
FIG. 7 is a view showing an example of app button information which is managed by the MFP in FIG. 1.

The app buttons 602 to 604 are operating buttons for shifting to the corresponding application screens. The MFP 100 manages types of the applications associated with the respective app buttons 602 to 604 by using app button information 700 in FIG. 7. The app button information 700 is stored in the HDD 106 and includes app button IDs 701 and application types 702. IDs uniquely assigned to the respective app buttons 602 to 604 are set as the app button IDs 701. Identifiers indicating types of the applications corresponding to the respective app buttons 602 to 604 are set as the application types 702.

For example, when the user depresses the app button 602 on the home screen 600, the CPU 102 reads out an identifier "copy" corresponding to the app button 602 from the app button information 700. Based on the read identifier "copy", the CPU 102 displays the copy setting screen 800 in FIG. 8, which is an application screen for the copying application, on the touch panel 200. The copy setting screen 800 is a screen for making print settings which are execution conditions for a print job to be executed by the copying application. The user is allowed to set a color mode, a sheet size, a magnification, the number of copies, and double-sided printing by operating the copy setting screen 800.

When the user depresses the app button 604 on the home screen 600, the CPU 102 reads out an identifier "use saved file" corresponding to the app button 604 from the app button information 700. Based on the read identifier "use saved file", the CPU 102 displays the file selection screen 900 in FIG. 9A, which is a first application screen for the saved file using application, on the touch panel 200. The file selection screen 900 is a screen for setting data to be printed, which are execution conditions for a print job to be executed by the saved file using application. The file selection screen 900 has a folder path 901, a file list 902, a scroll button 903, a cancel button 904, and a print button 906.

A folder path, which indicates a storage location designated by the user, is displayed as the folder path 901. A list of information on files stored at the storage location indicated by the folder path 901 (hereafter referred to as "file-related information") is displayed as the file list 902. The file-related information is comprised of a file name, a data format of a file, the number of pages in the file, and so forth. By depressing desired file-related information in the file list 902, the user switches files to be selected. A selection is represented by, for example, highlighting a color of a row in which file-related information on a selected file is displayed. In the example in FIG. 9A, "Minutes of Meeting.pdf" in the second row is selected. The scroll button 903 is a button for, when the entire list of file-related information cannot be displayed within one screen, issuing an instruction to display buttons lying off the screen. The cancel button 904 is an operating button for issuing an instruction to cancel a print job to be executed by the saved file using application. The print button 906 is an operating button for issuing an instruction to display the print setting screen 907 in FIG. 9B, which is a second application screen for the saved file using application. The print setting screen 907 is a screen for making print settings which are execution conditions for a print job executed by the saved file using application. On the print setting screen 907, the user is allowed to set a color mode, a sheet size, a magnification, the number of copies, and double-sided printing. The cancel button 908 is an operating button for issuing an instruction to cancel a print job to be executed by the saved file using application. The print start button 909 is an operating button for issuing an instruction to start a print job using the setting values on the file selection screen 900 and the print setting screen 907.

Referring again to FIG. 6, the custom buttons 605 and 606 are operating buttons for shifting to application screens set in advance. The application screens are displayed in a state where setting values registered in advance have been set. The custom buttons 605 and 606 are each categorized as either of a My button or a shared button. Only a user who has logged in is allowed to refer to the custom button categorized as the My button. All users are allowed to refer to the custom button categorized as the shared button. In the MFP 100, new custom buttons are registered by carrying out a custom button registration process in FIG. 10, to be described later.

The slide bar 607 switches pages of the menu 601. It should be noted that in the present embodiment, pages of the menu 601 are not always switched in this way, but for example, pages of the menu 601 may be switched when a flick operation is detected on the touch panel 200. In response to notification of a page switching instruction from the operating unit 111, the CPU 102 reads out information on buttons displayed on pages after page switching from the HDD 106 or the RAM 105 and carries out a process to switch pages of the menu 601.

A name of a user who is currently logged in the MFP 100 is displayed in the user name display area 608. The CPU 102 reads out the name of the user who is currently logged in the MFP 100 from the user information DB 400 and displays it on the touch panel 200. When a login session is not valid, a character string, an icon, or the like indicating that no one is logged in the MFP 100 is displayed, and for example, a fixed mark such as "-------" is displayed.

Figure 10:
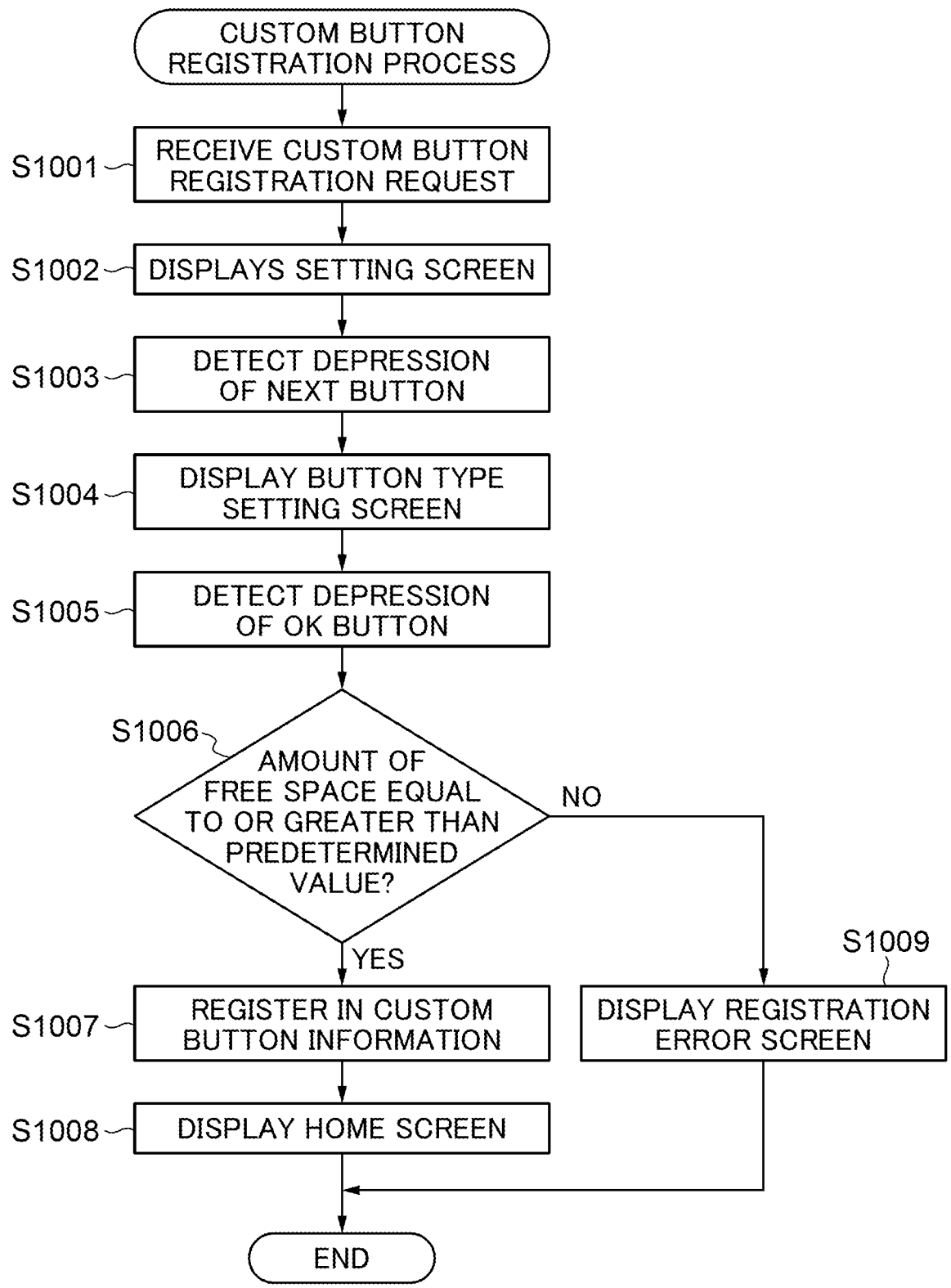
FIG. 10 is a flowchart showing the procedure of a custom button registration process which is carried out by the MFP in FIG. 1.

FIG. 10 is a flowchart showing the procedure of the custom button registration process which is carried out by the MFP 100 in FIG. 1. The process in FIG. 10 is implemented by the CPU 102 executing programs in the ROM 107 or the like. The process in FIG. 10 is carried out when, for example, a request to register a custom button for predetermined print settings has been issued by the user on a copy setting screen 1100 in FIG. 11. In this example, the predetermined print settings are comprised of a color mode "monochrome", sheet size "B4", finishing "punching", a magnification "144%", the number of copies "2", and "double-sided printing".

Figure 11:
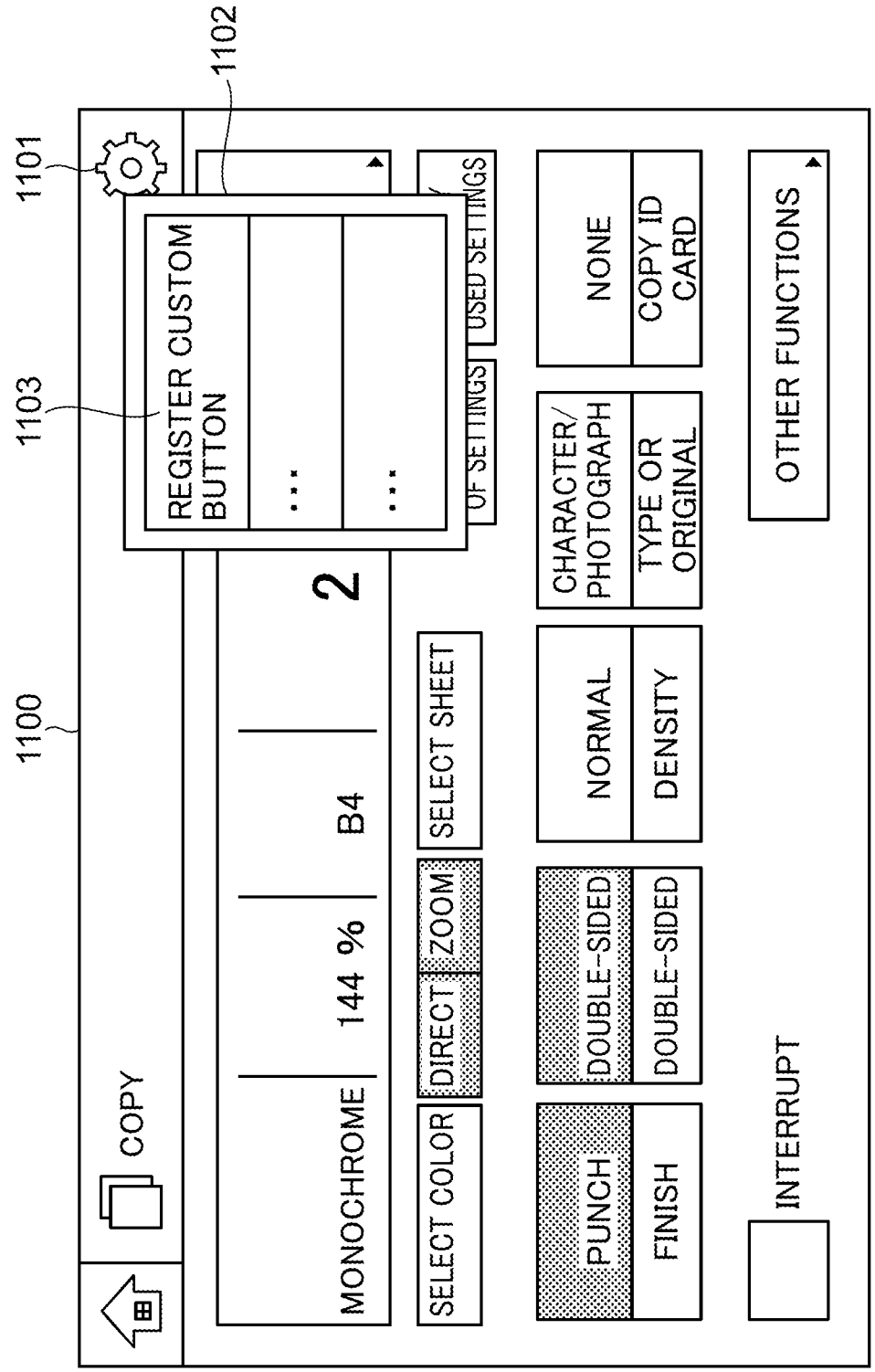
FIG. 11 is a view showing an example of a copy setting screen which is displayed on the touch panel in FIG. 2.
Figure 12:
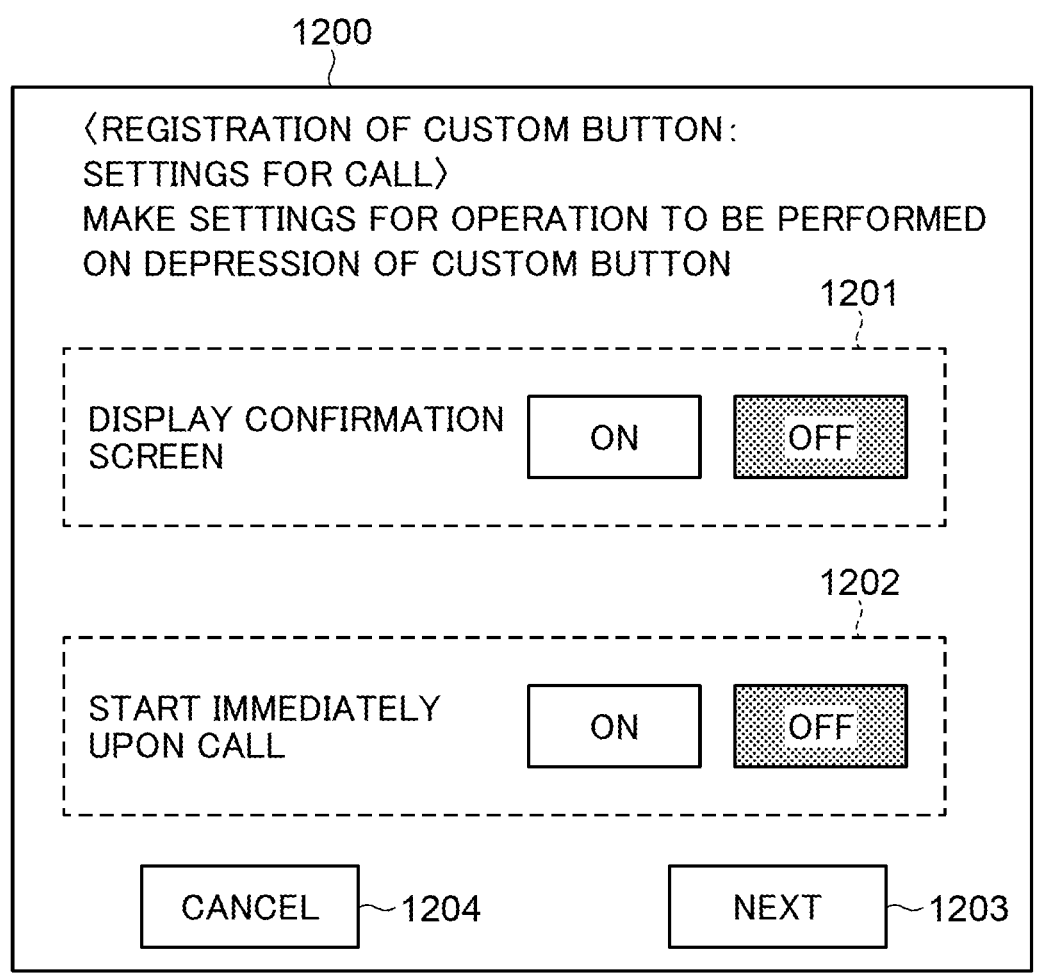
FIG. 12 is a view showing an example of a setting screen which is displayed on the touch panel in FIG. 2.
Figure 19:
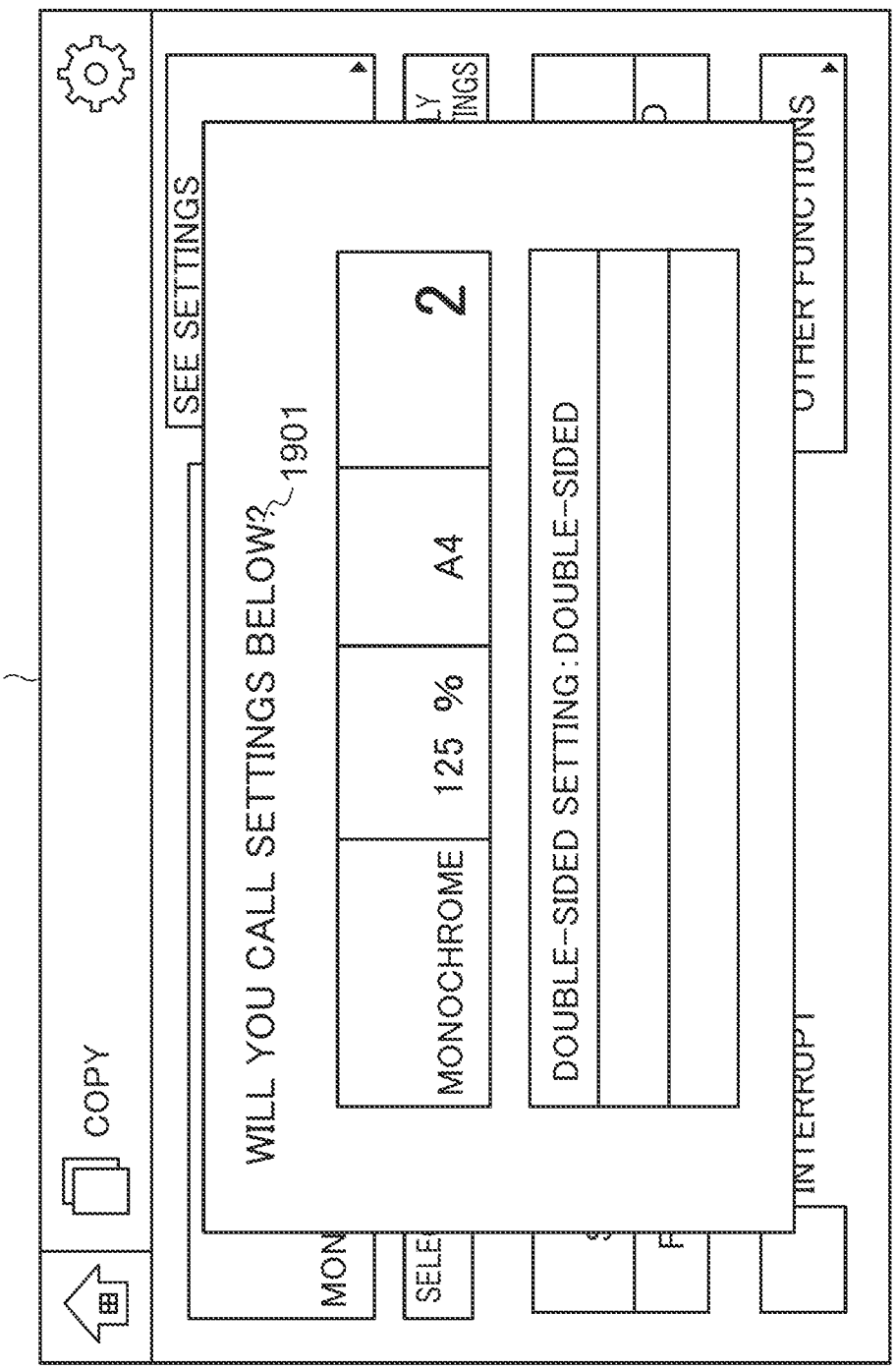
FIG. 19 is a view showing an example of a setting confirmation screen which is displayed on the touch panel in FIG. 2.

Referring to FIG. 10, first, when the user depresses a setting button 1101 in FIG. 11 on the copy setting screen 1100, the CPU 102 displays a setting menu 1102 on the copy setting screen 1100. The user depresses a registration button 1103 in the setting menu 1102 to make a custom button registration request. Upon receiving the custom button registration request (step S1001), the CPU 102 displays a setting screen 1200 in FIG. 12 on the touch panel 200 (step S1002). The setting screen 1200 has a confirmation screen display setting 1201, an immediate execution setting 1202, a next button 1203, and a cancel button 1204. As the confirmation screen display setting 1201, the user sets on-off information indicating whether or not to display a setting confirmation screen 1900 in FIG. 19, to be described later, when a registered custom button is depressed. As the immediate execution setting 1202, the user sets on-off information indicating whether or not to immediately execute a job based on setting values associated with a registered custom button when the custom button is depressed. When the cancel button 1204 is depressed, the CPU 102 ends the present process.

Figure 13:
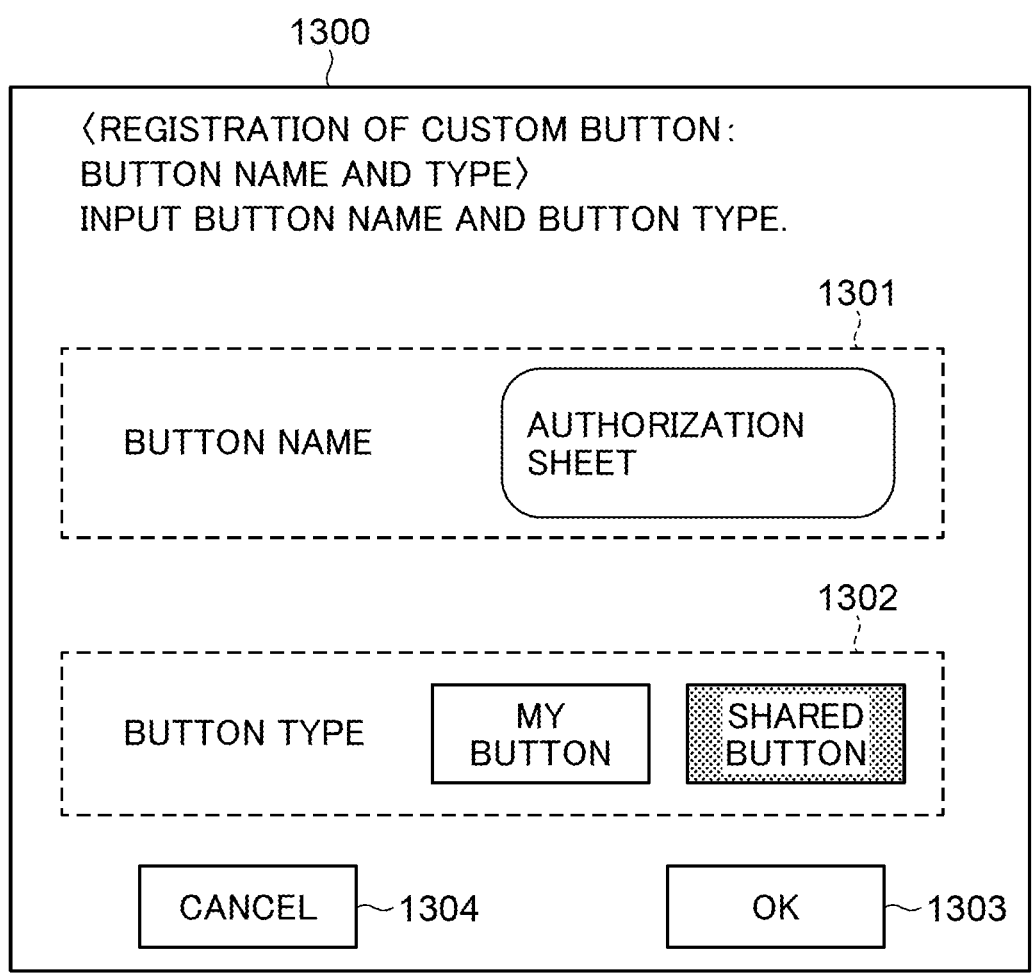
FIG. 13 is a view showing an example of a button type setting screen which is displayed on the touch panel in FIG. 2.

Upon detecting depression of the next button 1203 (step S1003), the CPU 102 displays a button type setting screen 1300 in FIG. 13 on the touch panel 200 (step S1004). The button type setting screen 1300 is a screen for setting a name and type of a custom button. The button type setting screen 1300 has a button name 1302, a button type 1302, an OK button 1303, and a cancel button 1304. As the button name 1301, a name of the custom button to be registered is input by the user. As the button type 1302, either of the My button and the shared button is selected by the user as a type of the custom button. When the cancel button 1304 is depressed, the CPU 102 ends the present process. Upon detecting depression of the OK button 1303 (step S1005), the CPU 102 determines whether or not the amount of a free space in the HDD 106 is equal to or greater than a predetermined value (step S1006).

As a result of the determination in the step S1006, when the amount of free space in the HDD 106 is equal to or greater than the predetermined value, the CPU 102 registers the custom button. Specifically, the CPU 102 registers the setting values set on the copy setting screen 1100, the setting screen 1200, and the button type setting screen 1300 as custom button information 1400 in FIG. 14 (step S1007). The custom button information 1400 is stored in the HDD 106 and manages information related to registered custom buttons. The custom button information 1400 includes a custom button ID 1401, a button type 1402, an owner user ID 1403, a button name 1404, an application type 1405, an update date 1406, application data 1407, a confirmation setting 1408, and an immediate execution setting 1409. The components of the custom button information 1400 are only examples, and the custom button information 1400 may have other items as well as the above described items.

As the custom button ID 1401, an ID uniquely assigned to the registered custom button is set. As the button type 1402, a setting value set as the button type 1302, and more specifically, either of the shared button and the My button is set. When the button type 1402 is the My button, a user ID for identifying the user who has made the request to register the custom button is set as the owner user ID 1403. The setting value set as the button name 1301 is set as the button name 1404. As the application type 1405, an identifier indicating a type of an application corresponding to the registered custom button is set. As the update date 1406, a registration date and time or update date and time for the custom button is set. As the application data 1407, the setting values set on the copy setting screen 1100 are set using HashMap i.e. "KEY/VALUE". The setting value set as the confirmation screen display setting 1201 is set as the confirmation setting 1408. The setting value set as the immediate execution setting 1202 is set as the immediate execution setting 1409. In the step S1007, custom button-related information 1501 in FIG. 15 is registered as the custom button information 1400.

Figure 16:
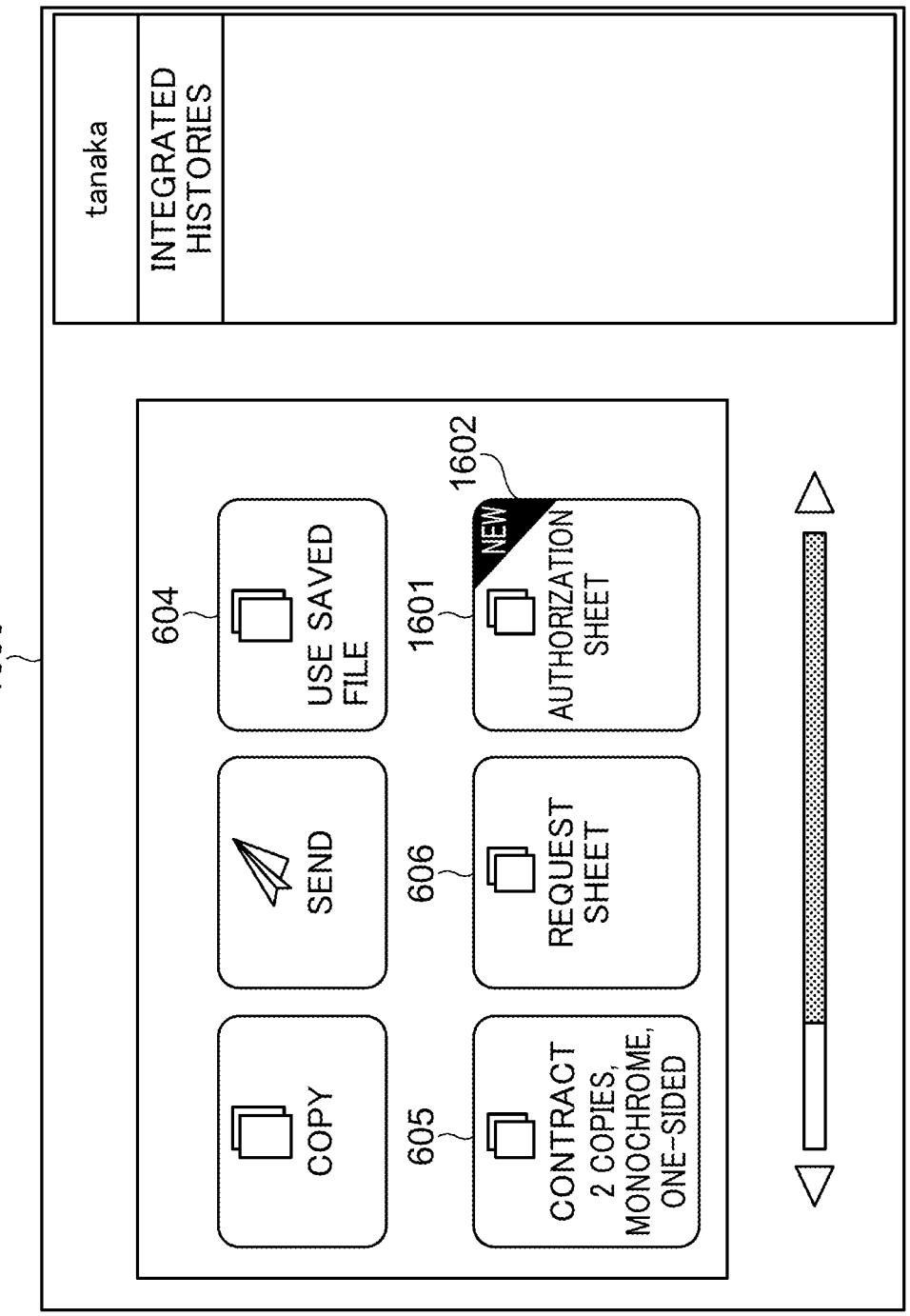
FIG. 16 is a view showing an example of a home screen which is displayed on the touch panel in FIG. 2.

Next, the CPU 102 displays a home screen 1600 in FIG. 16 on the touch panel 200 (step S1008). On the home screen 1600, a custom button 1601 corresponding to the custom button-related information 1501 is displayed in addition to the custom button 605 and 606. A NEW icon 1602 indicating a new registration is displayed on the custom button 1601. The NEW icon 1602 is hidden with arbitrary timing such as login, logout, auto clear, sleep, shutdown, or depression of the custom button 1601. After that, the CPU 102 ends the present process.

As a result of the determination in the step S1006, when the amount of free space in the HDD 106 is less than the predetermined value, the CPU 102 displays a registration error screen (not shown) on the touch panel 200 (step S1009) and ends the present process.

Figure 17:
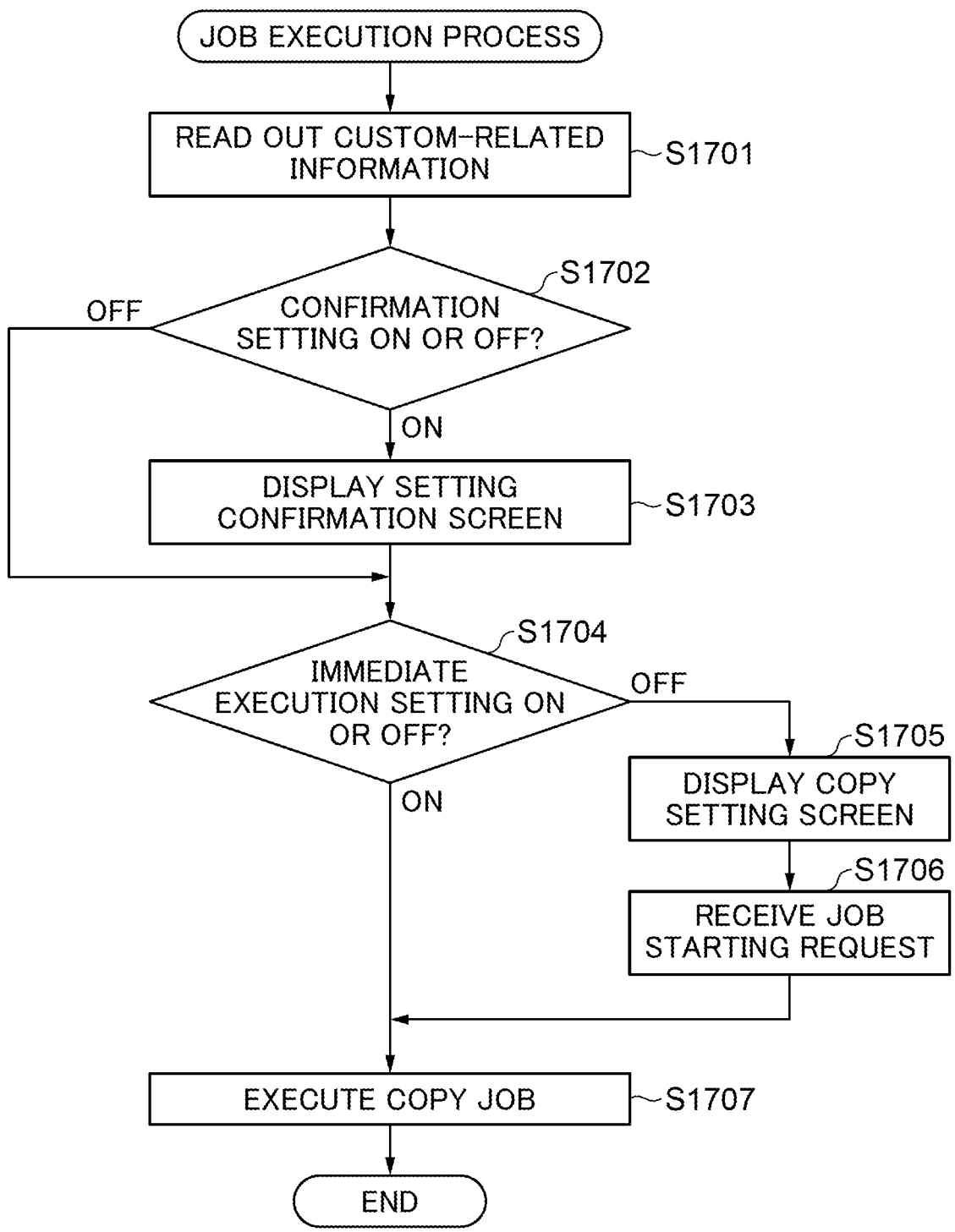
FIG. 17 is a flowchart showing the procedure of a job execution process which is carried out by the MFP in FIG. 1.

FIG. 17 is a flowchart showing the procedure of a job execution process which is carried out by the MFP 100 in FIG. 1. The process in FIG. 17 is implemented by the CPU 102 executing programs in the HDD 106. The process in FIG. 17 is carried out when the user has depressed any of the custom buttons 605, 606, and 1601 on the home screen 1600.

Referring to FIG. 17, first, the CPU 102 reads out custom button-related information corresponding to the depressed custom button from the custom button information 1400 (step S1701). For example, when the user has depressed the custom button 605, the CPU 102 reads out custom button-related information 1801 in FIG. 18 corresponding to the custom button 605 from the custom button information 1400. Next, the CPU 102 determines whether a setting value of the confirmation setting 1408 in the custom button-related information 1801 is "ON" or "OFF" (step S1702).

As a result of the determination in the step S1702, when the setting value of the confirmation setting 1408 is "OFF", the CPU 102 carries out a process in step S1704, to be described later. As a result of the determination in the step S1702, when the setting value of the confirmation setting 1408 is "ON", the CPU 102 displays a setting confirmation screen 1900 in FIG. 19 on the touch panel 200 (step S1703). The setting confirmation screen 1900 includes a message 1901 asking whether or not to call the custom button-related information 1801. Then, the CPU 102 determines whether or not a setting value of the immediate execution setting 1409 in the custom button-related information 1801 is "ON" or "OFF" (step S1704).

Figure 20:
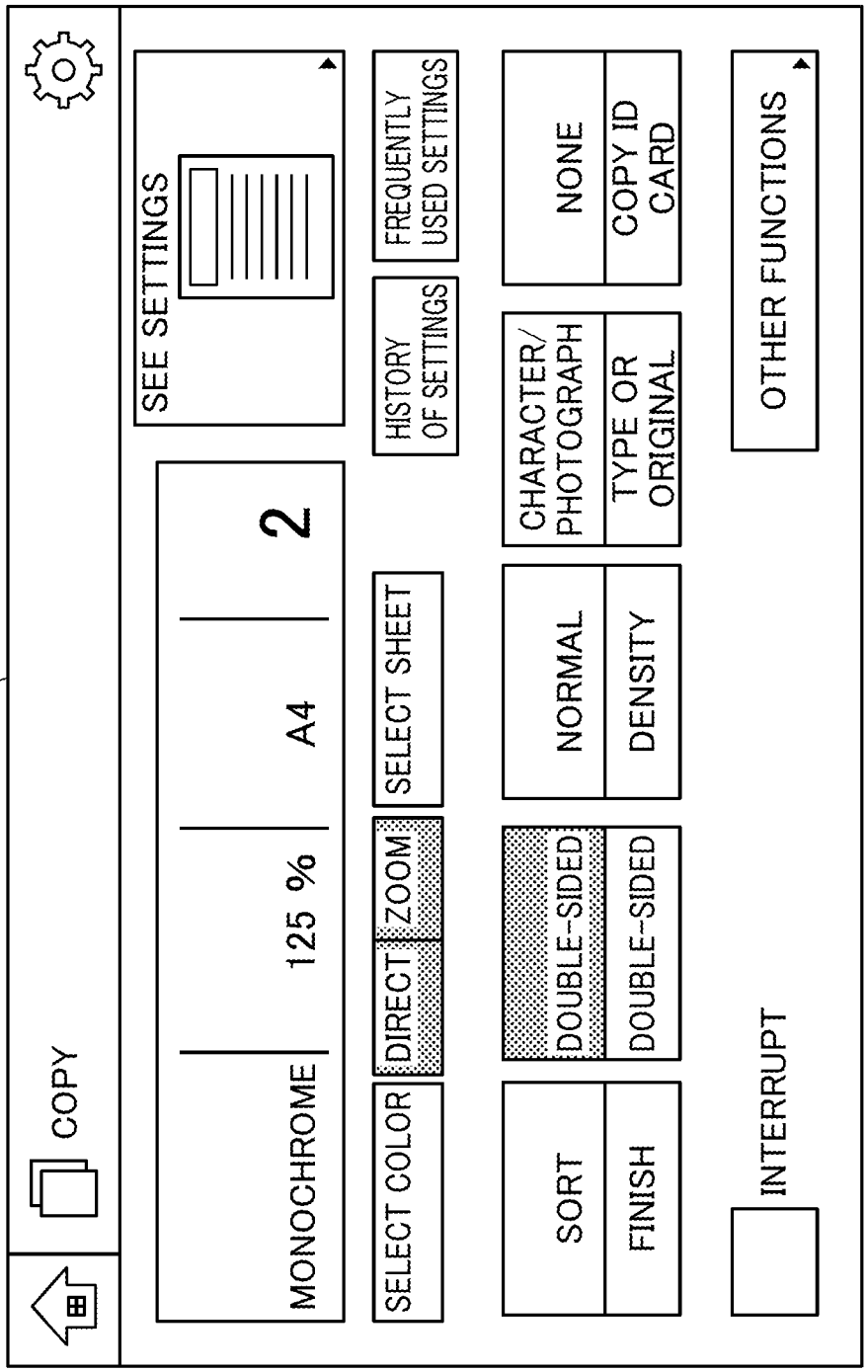
FIG. 20 is a view showing an example of a copy setting screen which is displayed on the touch panel in FIG. 2.
Figure 21:
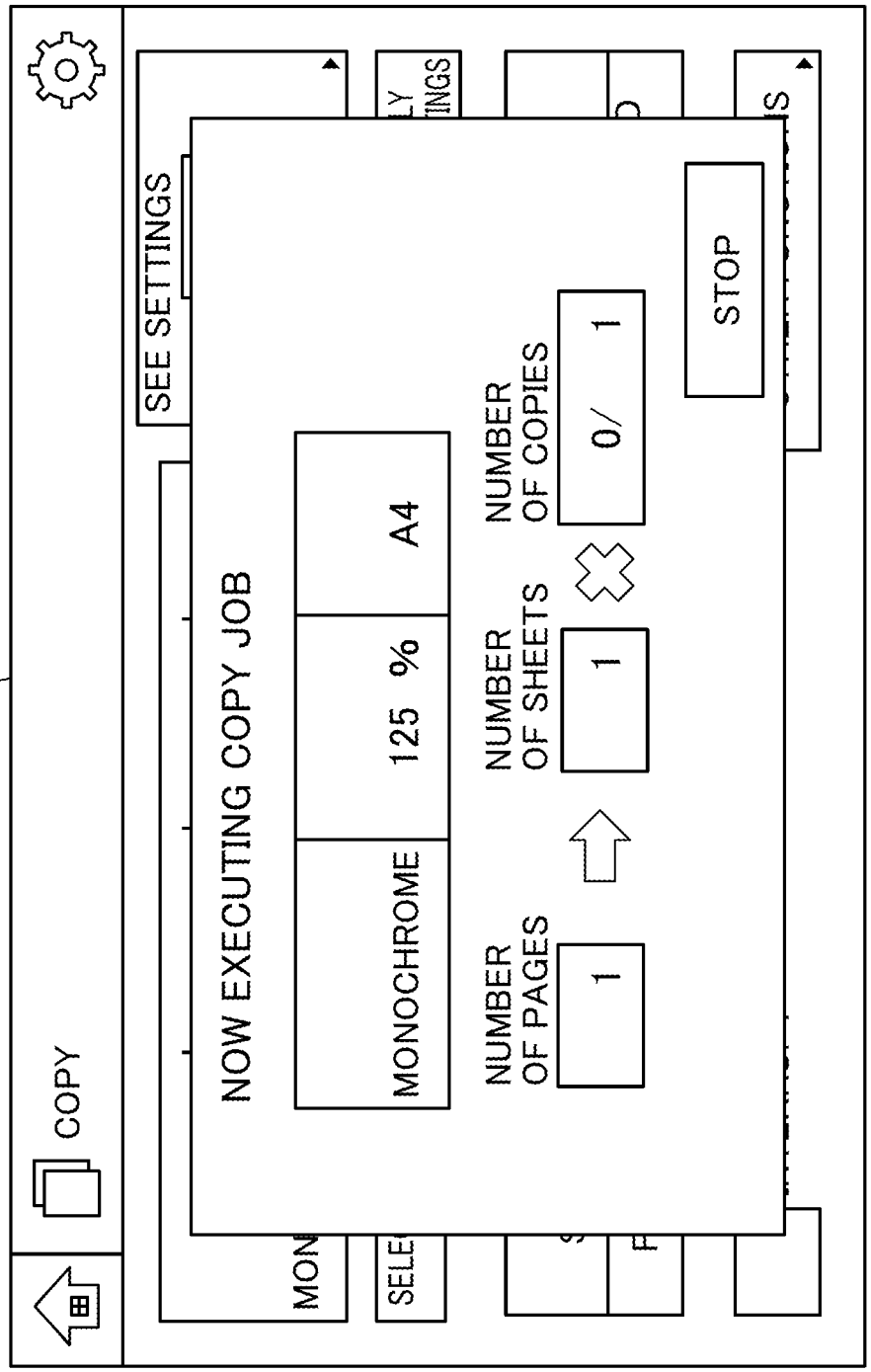
FIG. 21 is a view showing an example of an in-execution screen which is displayed on the touch panel in FIG. 2.

As a result of the determination in the step S1704, when the setting value of the immediate execution setting 1409 is "OFF", the CPU 102 displays a copy setting screen 2000 in FIG. 20 on the touch panel 200 (step S1705). The setting values of the application data 1407 in the custom button-related information 1801 are set in respective setting fields of the copy setting screen 2000. Then, upon detecting depression of the start key 201 by the user and receiving a job starting request (step S1706), the CPU 102 executes a copy job based on the print settings configured on the copy setting screen 2000 (step S1707). While the copy job is being executed, an in-execution screen 2100 in FIG. 21 is displayed on the touch panel 200. After that, the CPU 102 ends the present process.

As a result of the determination in the step S1704, when the setting value of the immediate execution setting 1409 is "ON", the CPU 102 carries out the processes in the step S1707 and the subsequent steps without displaying the copy setting screen 2000 in FIG. 20 on the touch panel 200.

As described above, the MFP 100 enables the user to easily issue an instruction to execute a print job by using the custom button registration function, but the user needs to perform the custom button registration function described above, which takes a lot of time and effort. To save the time and effort, for example, a reprint function of performing printing the same file using the same settings, and more specifically, print settings based on setting histories of print jobs executed in the past is used. The user can easily issue an instruction to execute a job based on execution conditions set in the past without performing the custom button registration function described above. With the reprint function, however, it is necessary for the user to restart by designating a folder so as to issue an instruction to execute a print job for which a part of execution conditions set in the past has been changed, for example, a print job of printing another file stored in the same folder. Thus, the user cannot easily issue an instruction to execute a print job for another file stored at the same storage location.

Accordingly, in the present embodiment, an execution condition for an executed print jobs is managed as a record. When the user selects the record, a file selection screen is selected so that the user can select data to be printed from all files stored at a storage location associated with the record.

Figure 22:
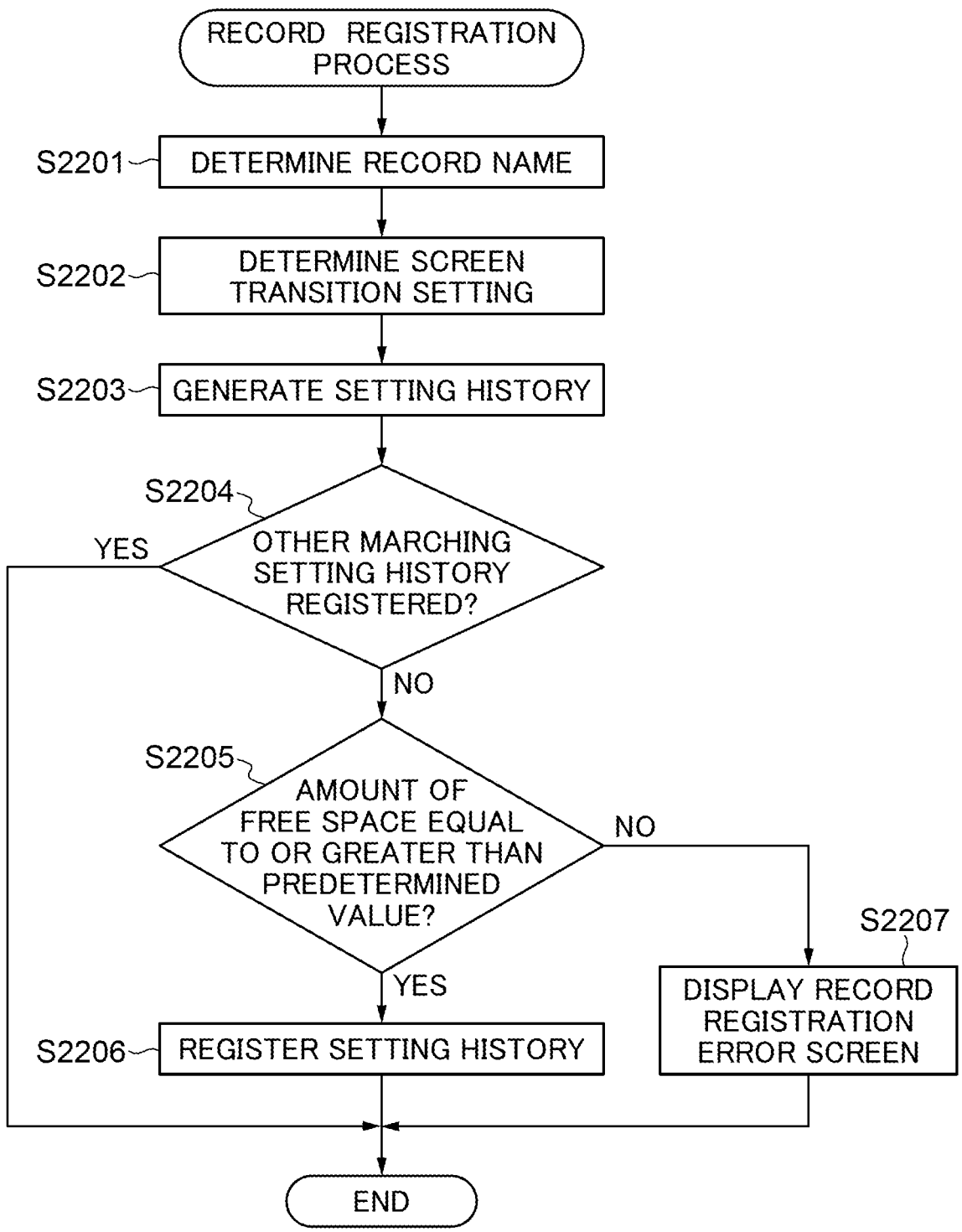
FIG. 22 is a flowchart showing the procedure of a record registration process which is carried out by the MFP in FIG. 1.

FIG. 22 is a flowchart showing the procedure of a record registration process which is carried out by the MFP 100 in FIG. 1. The process in FIG. 22 is implemented by the CPU 102 executing programs in the ROM 107 or the like. The process in FIG. 22 is carried out when, for example, a job executing instruction issued by the user is received. The process in FIG. 22 is based on the assumption that, for example, an instruction to execute a print job using the saved file using application for which the execution conditions in FIGS. 9A and 9B are set has been received.

Referring to FIG. 22, first, the CPU 102 determines a record name (step S2201). The record name is represented by a character string or an icon so that the user can easily recognize what is included in a record. For example, a file name is represented by an absolute path that identifies a storage location, and setting values of main setting items among print settings are represented by character strings or icons. The main setting items include, for example, print settings items such as a color mode, double-sided printing, finishing, and the number of copies. The record name may also be a setting value changed from a factory default setting value through operation by the user.

Figure 23:
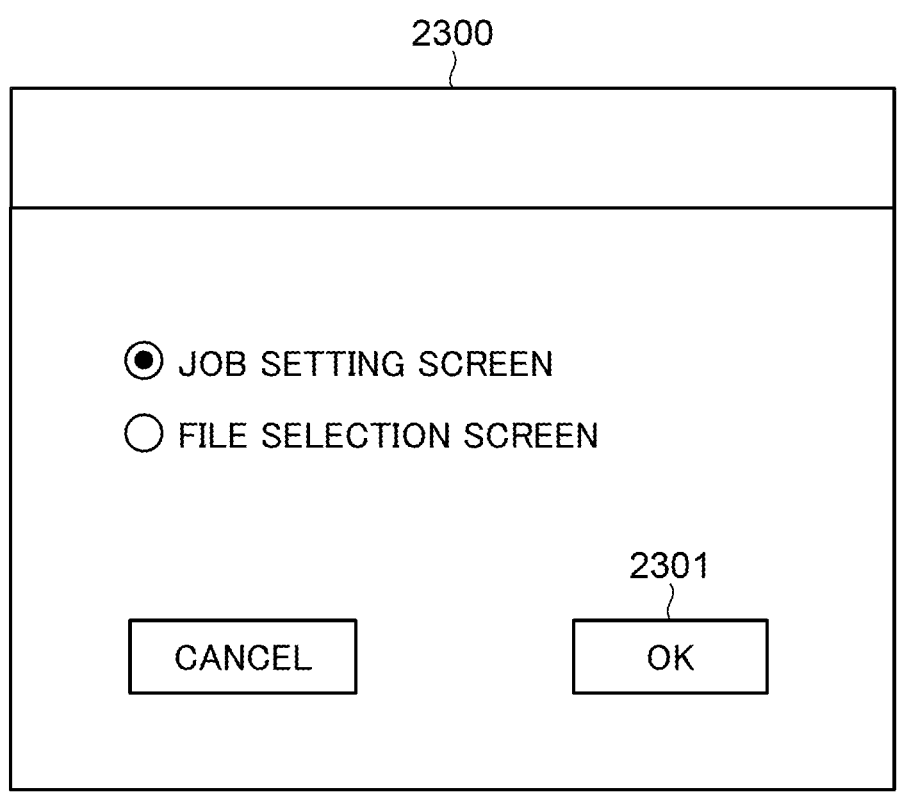
FIG. 23 is a view showing an example of a selection screen which is displayed on the touch panel in FIG. 2.

Next, the CPU 102 displays a selection screen 2300 in FIG. 23 on the touch panel 200. On the selection screen 2300, information that identifies an application screen to be displayed when the user selects a record with which the above execution conditions are associated is set. Specifically, on the selection screen 2300, the user selects either of a job setting screen and a file selection screen. When the job setting screen is selected, an application screen for making print settings on the print setting screen 907 or the like is displayed on the touch panel 200 when the user depresses a record with which the above execution conditions are associated. When the file selection screen is selected, an application screen for setting data to be printed on the file selection screen 907 or the like is displayed on the touch panel 200 when the user depresses a record with which the above execution conditions are associated.

Upon detecting depression of an OK button 2301 by the user, the CPU 102 determines a screen transition setting based on the setting value on the selection screen 2300 (step S2202). The setting value on the selection screen 2300 may be used as either a setting value unique to the user or a setting value common to the MFP 100.

Then, the CPU 102 issues a new record ID so as to register the record associated with the above execution conditions in record information 2400 in FIG. 24 in which information on records is managed. The record information 2400 is stored in the HDD 106 and includes a record ID 2401, a record type 2402, an owner user ID 2403, a record name 2404, an application type 2405, an update date 2406, application data 2407, and a screen transition setting 2408 (identification information). The components of the record information 2400 are only examples, and the record information 2400 may include other items in addition to the above described items, for example, items similar to the confirmation setting 1408 and the immediate execution setting 1409 in the custom button information 1400. The number of items in the record information 2400 may vary with application types.

As the record ID 2401, an ID uniquely assigned to the record is set. As the record type 2402, either of a shared record and my record is set. When the record type 2402 is the my record, a user ID for identifying the user who has set the execution conditions for the record is set as the owner user ID 2403. As the record name 2404, the record name determined in the process in the step S2201 is set. As the application type 2405, an identifier indicating a type of an application corresponding to the record is set. As the update date 2406, a registration date and time for the record is set. As the application data 2407, the job setting values are set using HashMap i.e. "KEY/VALUE". For example, as the application data 2407, a folder path indicating a storage location for print settings and data to be printed is set. As the screen transition setting 2408, the screen transition setting made in the process in the step S2202 is set.

After that, the CPU 102 generates a setting history 2500 in FIG. 25 based on the issued record ID, the result of the process in the step S2201, the above execution conditions, and the setting values on the selection screen 2300 (step S2203) and reads out the record information 2400. The CPU 102 then compares the setting history 2500 and the record information 2400 with each other. The CPU 102 determines whether or not another setting history including the application data 2407 matching the setting history 2500 is registered in the record information 2400 (step S2204).

As a result of the determination in the step S2204, when the other setting history is not registered in the record information 2400, the CPU 102 determines whether or not the amount of free space in the HDD 106 is equal to or greater than a predetermined value (step S2205).

As a result of the determination in the step S2205, when the amount of free space in the HDD 106 is equal to or greater than the predetermined value, the CPU 102 registers the setting history 2500 in the record information 2400 (step S2206) and ends the present process.

As a result of the determination in the step S2205, when the amount of free space in the HDD 106 is less than the predetermined value, the CPU 102 displays a record registration error screen (not shown) on the touch panel 200 (step S2207) and ends the present process.

As a result of the determination in the step S2204, when the other setting history is registered in the record information 2400, the CPU 102 ends the present process without registering the setting history 2500 in the record information 2400.

Thus, an executing instruction for an executed print job is managed as a record in the MFP 100 without the need to perform the above described custom button registration operation.

Figure 26:
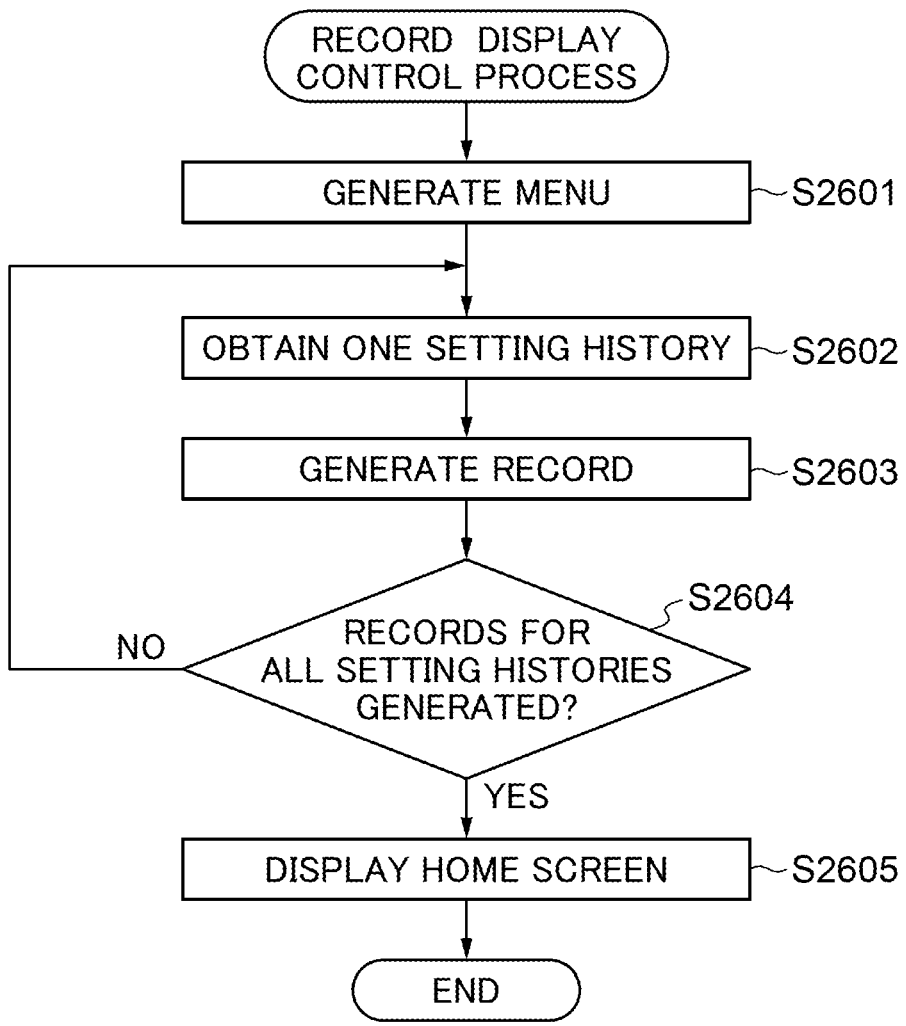
FIG. 26 is a flowchart showing the procedure of a record display control process which is carried out by the MFP in FIG. 1.

FIG. 26 is a flowchart showing the procedure of a record display control process which is carried out by the MFP 100 in FIG. 1.

The process in FIG. 26 is implemented by the CPU 102 executing programs in the HDD 106. The process in FIG. 26 is carried out when a login session has been started by the authentication process in FIG. 3.

Referring to FIG. 26, first, the CPU 102 generates the menu 601 based on the app button information 700 and the custom button information 1400 (step S2601). Next, the CPU 102 obtains one setting history from the record information 2400 (step S2602), and based on the one obtained setting history, generates a record that is to be displayed on the home screen 600 (step S2603). Then, the CPU 102 determines whether or not records for all of setting histories registered in the record information 2400 have been generated (step S2604).

As a result of the determination in the step S2604, when a record for any of the setting histories registered in the record information 2400 has not been generated, the process returns to the step S2602.

Figure 27:
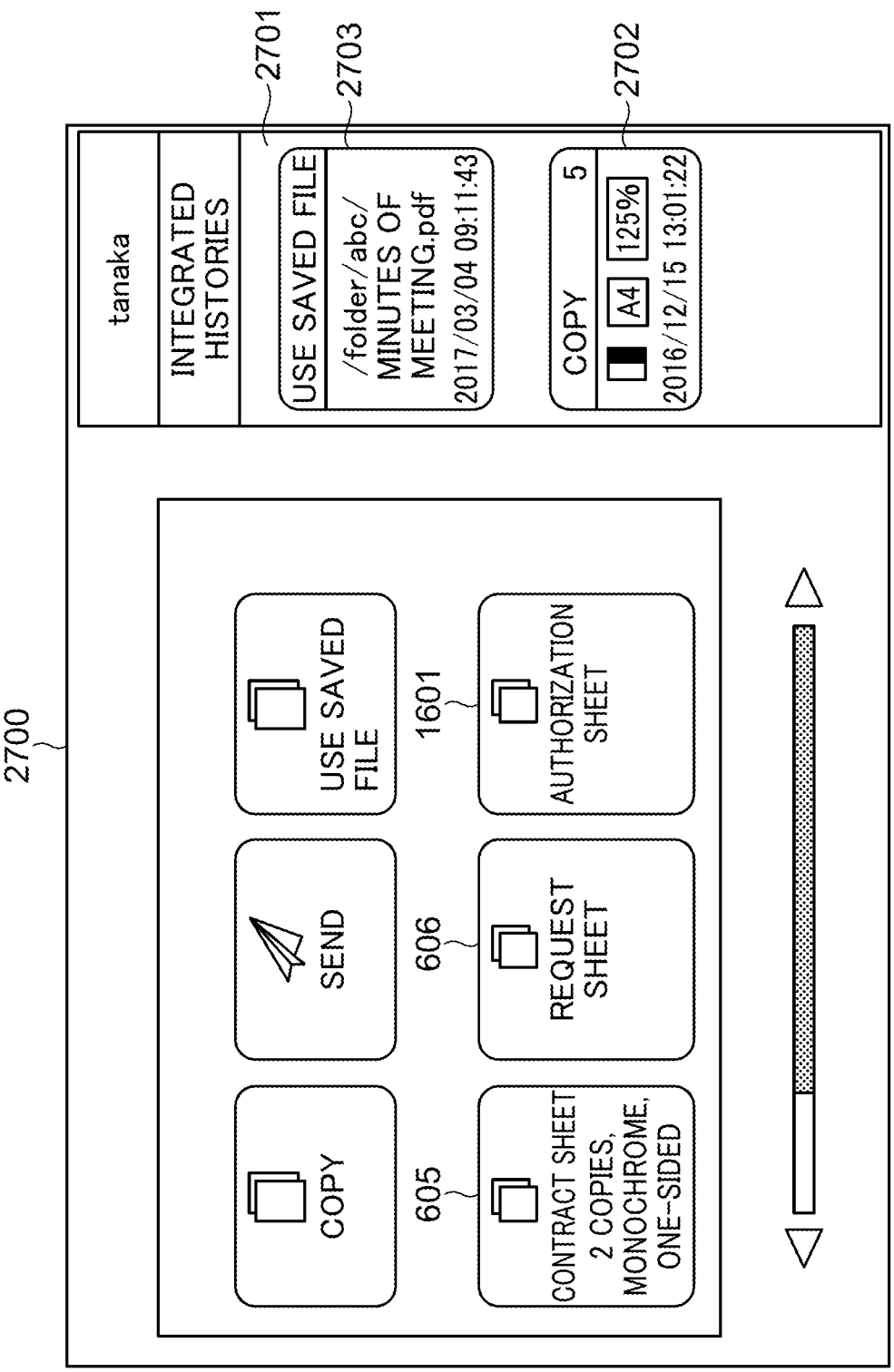
FIG. 27 is a view showing an example of a home screen which is displayed on the touch panel in FIG. 2.

As a result of the determination in the step S2604, when records for all of the setting histories registered in the record information 2400 have been generated, the CPU 102 displays the generated menu 601 and a home screen 2700 in FIG. 27 including the records on the touch panel 200 (step S2605). In a timeline 2701 on the home screen 2700, records 2702 and 2703 generated by the process in the step S2603 are displayed. In the present embodiment, when a job is executed, a record with which execution conditions for the job are associated is placed at the top in the timeline 2701. When the number of records has increased to such an extent as not to fit in the timeline 2701, a scroll bar (not shown) is displayed in the timeline 2701. The user uses the scroll bar to display records extending off the timeline 2701. When the number of records has reached a predetermined number, the records are deleted in order from the oldest one. After that, the CPU 102 ends the present process.

Figure 28:
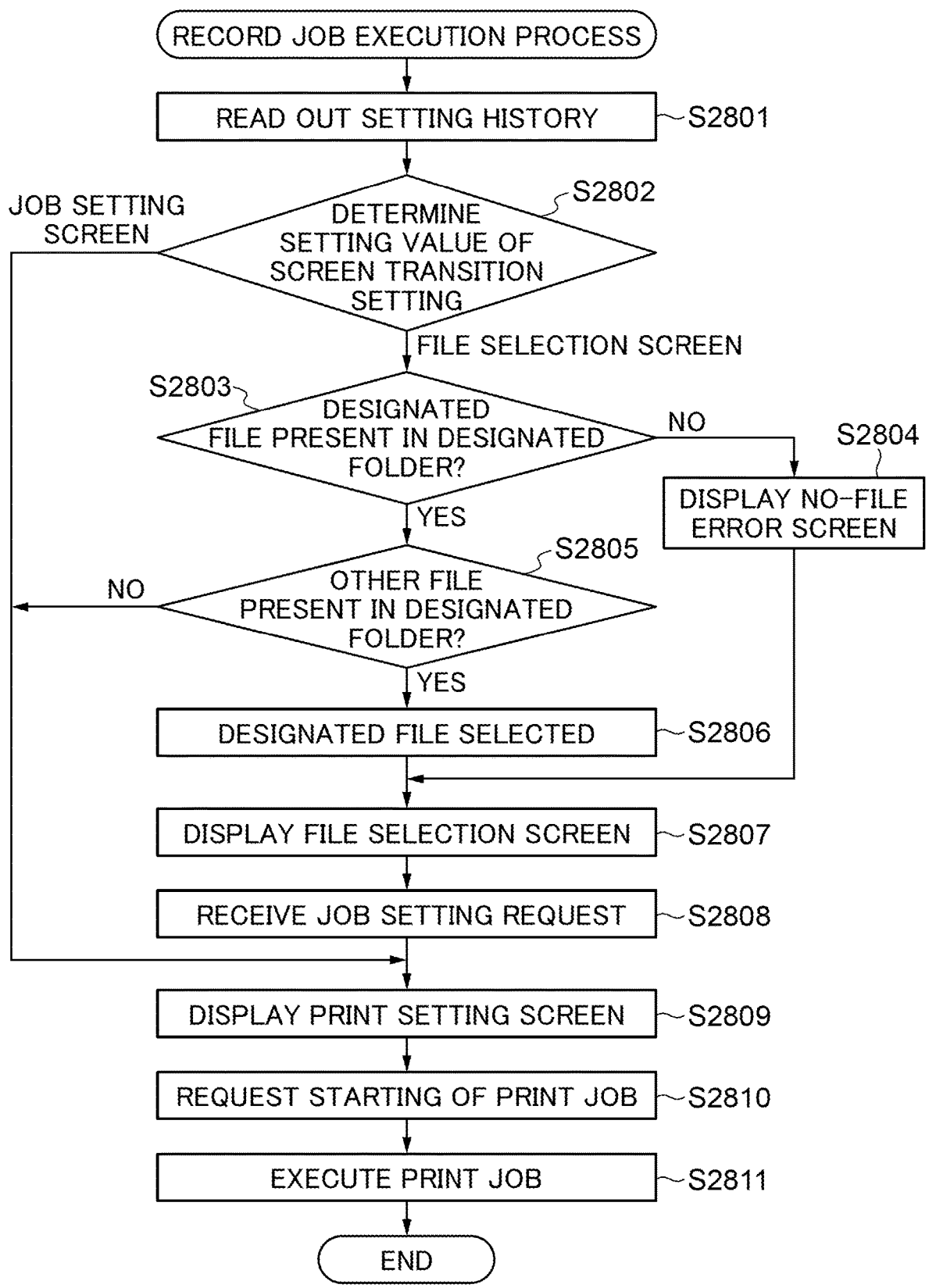
FIG. 28 is a flowchart showing the procedure of a record job execution process which is carried out by the MFP in FIG. 1.

FIG. 28 is a flowchart showing the procedure of a record job execution process which is carried out by the MFP 100 in FIG. 1. The process in FIG. 28 is implemented by the CPU 102 executing programs in the HDD 106. The process in FIG. 28 is based on the assumption that, for example, the user has depressed either of the records 2702 and 2703 on the home screen 2700.

Referring to FIG. 28, first, the CPU 102 reads out a setting history corresponding to the depressed record from the record information 2400 (step S2801). For example, when the user has depressed the record 2703, the CPU 102 reads out a setting history 2901 in FIG. 29 corresponding to the record 2703 from the record information 2400. Next, the CPU 102 determines a setting value of the screen transition setting 2408 in the setting history 2901 (step S2802).

In the step S2802, when the setting value of the screen transition setting 2408 is "job setting screen", the CPU 102 carries out a process in step S2809, to be described later. In the step S2802, when the setting value of the screen transition setting 2408 is "file selection screen", the CPU 102 obtains a folder path and a file name from the application data 2407 in the setting history 2901. Then, the CPU 102 determines whether or not a file with the above file name (hereafter referred to as "the designated file") is present in a designated folder indicated by the above folder path (step S2803).

As a result of the determination in the step S2803, when the designated file is not present in the designated folder, the CPU 102 displays a no file error screen (not shown) on the touch panel 200 (step S2804) and carries out a process in step S2807.

As a result of the determination in the step S2803, when the designated file is present in the designated folder, the CPU 102 determines whether or a file other than the designated file is present in the designated folder (step S2805).

As a result of the determination in the step S2805, when a file other than the designated file is present in the designated folder, the CPU 102 displays on the touch panel 200 a file selection screen 3000 in FIG. 30A with the designated file in the selected state (steps S2806, S2807). This enables the user to easily select another file stored in the designated folder by operating the file selection screen 3000. Then, the CPU 102 detects depression of a print button 3001 on the file selection screen 3000 by the user and receives a job setting request (step S2808). After that, the CPU 102 displays a print setting screen 3002 in FIG. 30B on the touch panel 200 (step S2809). The print setting screen 3002 is displayed in a state where the setting values of the application data 2407 in the setting history 2901 have been set.

Figure 31:
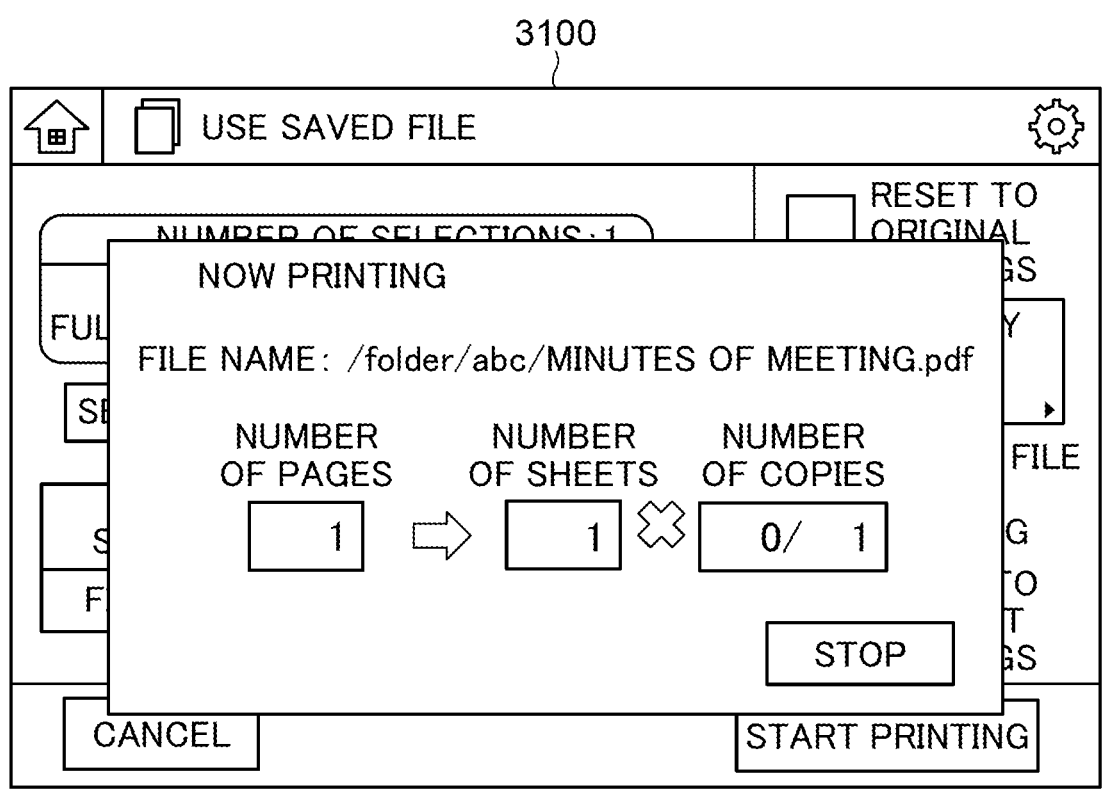
FIG. 31 is a view showing an example of an in-execution screen which is displayed on the touch panel in FIG. 2.

The CPU 102 then detects depression of a print start button 3003 by the user, and upon receiving a request to execute a print job (step S2810), executes the print job (step S2811). The print job is executed based on the setting values on the file selection screen 3000 and the print setting screen 3002. While the print job is being executed, an in-execution screen 3100 in FIG. 31 is displayed on the touch panel 200. After that, the CPU 102 ends the present process.

As a result of the determination in the step S2805, when no file other than the designated file is present in the designated folder, that is, only the designated file is present in the designated folder, the CPU 102 carries out the process in the step S2809 without displaying the file selection screen 3000 on the touch panel 200.

According to the embodiment described above, the execution conditions for the executed print jobs are managed as the records 2702 and 2703. Also, the file selection screen 3000 is displayed so that the user can select data to be printed from all the files stored at the storage location associated with the record 2703 when one of the records 2702 and 2703, for example, the record 2703 is selected. Thus, execution conditions for print jobs executed in the past are easily called without performing the above described custom button registration operation. Furthermore, to print another file stored in the same folder as files printed in the past, the other file is easily selected. As a result, an instruction to execute another print job stored at the same storage location is easily issued without performing the above described custom button registration operation.

Furthermore, in the embodiment described above, in a case where only the designated file is stored at the storage location associated with the record 2703 when the user selects the record 2703, the print setting screen 3002 is displayed without displaying the file selection screen 3000. Here, in the case where only the designated file is stored at the storage location associated with the record 2703, it is easily assumed that the designated file is data to be printed. In this case, from the viewpoint of improving the ease of operation in giving an instruction to execute a job, setting of data to be printed is preferably regarded as being completed, and the print setting screen 3002 for setting other execution conditions, and more specifically, making print settings is preferably displayed. On the other hand, in the embodiment described above, in the case where only the designated file is stored at a storage location associated with a record when the user has selected the record, the print setting screen 3002 is displayed without displaying the file selection screen 3000. This improves the ease of operation in giving an instruction to execute a job.

In the embodiment described above, when the user has selected a record, whether to display the file selection screen or the print setting screen is determined based on a setting value on the screen transmission setting 2408 associated with the record. Thus, a type of an application screen to be displayed is determined with respect to each record.

Moreover, in the embodiment described above, since the screen transition setting 2408 is made by the user, an appropriate application screen is displayed according to user's pattern of usage.

Although the prevent invention has been described by way of the embodiment, the present invention is not limited to the embodiment described above. For example, the record 2702 or 2703 on which the user has performed a predetermined operation may be registered as a custom button. When, for example, the user holds down the record 2703 in the timeline 2701, a popup menu (not shown) for receiving an instruction to register the record 2703 as a custom button is displayed on the touch panel 200. Upon receiving the registration instruction via the popup menu, the CPU 102 generates a custom button for calling the setting history of the record 2703. Thus, a setting history that is not desired to be deleted is easily left, and hence this setting history can be called with desired timing.

Moreover, in the embodiment described above, the authentication method is not limited to the one used in the process in FIG. 3, but the MFP 100 may be connected to an authentication server via the communication unit 103, and a result of authentication using the external authentication server may be used.

In the embodiment described above, the setting value of the screen transmission setting 2408 may be managed by another setting file other than the record information 2400.

Moreover, in the embodiment described above, the user is prompted to select an application screen for transition whenever he or she depresses a record.

In the embodiment described above, the screen transition setting is not always determined using the selection screen 2300 in the process in FIG. 22, but may be determined from user's operation histories. For example, when an instruction to execute a print job for which print settings have been changed although a file or folder has not been changed is received from the same user, the CPU 102 configures the screen transition setting at the job setting screen. When an instruction to execute a print job for which have been specified with a different file stored in the same folder although print settings have not been changed is received from the same user, the CPU 102 configures the screen transition setting at the file selections screen.

In the embodiment described above, not the no-file error screen but an icon or message indicating that the designated file is not present in the designated folder may be displayed in the step S2804, and furthermore, the record 2703 may be deleted from the timeline 2701.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004349, filed Jan. 15, 2018, which is hereby incorporated by reference herein in its entirety.

What is claimed is:

1. A printing apparatus that has at least an application for using one or more files in a folder managed by the printing apparatus or an external apparatus different from the printing apparatus, the printing apparatus comprising:
   a display device; and
   a controller including a processor and memory, the controller configured to:
   on a basis of execution of one job that had been carried out by using the application, generate one history button that obtains setting contents for the one job, where the setting contents include folder information indicating a folder that stores a first file designated in the execution of the one job;
   in a case where the history button is selected, specify the first file based on the setting contents corresponding to the selected history button;
   in a case where a plurality of files including the first file are stored in the folder corresponding to the obtained folder information, display a list of the plurality of files including the first file on the display device; and
   execute a job on a basis of one or more files selected from the list of the plurality of files and of setting contents corresponding to the selected history button.

2. The printing apparatus according to claim 1, wherein in a case where a file to be printed is selected from the list, the controller is configured to cause the display device to display a setting screen for receiving print settings for use in printing of the file to be printed, and
   the controller is configured to cause the display device to display the setting screen without displaying the list in a case where only the first file is stored in the folder corresponding to the obtained folder information.

3. The printing apparatus according to claim 2, wherein the controller is configured to manage identification information that identifies one of the list and the setting screen, and
   the controller is configured to select a content to be displayed among the list and the setting screen based on the managed identification information when reading the print settings.

4. The printing apparatus according to claim 3, wherein the identification information is set by a user.

5. The printing apparatus according to claim 3, wherein the print settings and the identification information are deleted when a predetermined condition is satisfied, and
   in response to a predetermined operation on the print settings and the identification information by the user, the printing apparatus generates a custom button for calling the print settings and the identification information.

6. The printing apparatus according to claim 1, wherein the controller is configured to cause the display device to display the generated history button, and
   when the displayed history button is selected by a user, the printing apparatus reads out the setting contents corresponding to the selected history button.

7. The printing apparatus according to claim 6, wherein a storage location of the first file is displayed on the displayed history button.

8. The printing apparatus according to claim 6, wherein multiple history buttons are caused to be displayed.

9. The printing apparatus according to claim 6, wherein the controller is configured to cause the display device to display the history button together with a copy button for calling a copy setting screen.

10. The printing apparatus according to claim 6, wherein the controller is configured to cause the display device to display the history button on a home screen which can be operated by a user who has logged into the printing apparatus.

11. The printing apparatus according to claim 1, wherein in a case where the first file is failed to be specified based on the setting contents, the controller is configured to cause the display device to display information that the first file has been failed to be specified based on the setting contents.

12. The printing apparatus according to claim 1, wherein in a case where it is determined that a file or files other than the first file is not stored in the folder, the controller is configured to cause the display device to omit to display the list of the plurality of files.

13. The printing apparatus according to claim 1, wherein in a case where it is determined that a file or files other than the first file is not stored in the folder, the controller is configured to cause the display device to display a setting screen reflecting the setting contents corresponding to the selected history button.

14. A control method for a printing apparatus that has at least an application for using one or more files in a folder managed by the printing apparatus or an external apparatus different from the printing apparatus, the method comprising:
   generating, on a basis of execution of one job that had been carried out by using the application, one history button that obtains setting contents for the one job where the setting contents include folder information indicating a folder that stores a first file designated in the execution of the one job;
   specifying, in a case where the history button is selected, the first file based on the setting contents corresponding to the selected history button;
   displaying, in a case where a plurality of files including the first file are stored in the folder corresponding to the obtained folder information, a list of the plurality of files including the first file on the display device; and
   executing a job on a basis of one or more files selected from the list of the plurality of files and of setting contents corresponding to the selected history button.

15. A non-transitory computer-readable storage medium storing a program for causing a computer to execute a control method for a printing apparatus that has at least an application for using one or more files in a folder managed by the printing apparatus or an external apparatus different from the printing apparatus, the control method for the printing apparatus comprising:
   generating, on a basis of execution of one job that had been carried out by using the application, one history button that obtains setting contents for the one job where the setting contents include folder information indicating a folder that stores a first file designated in the execution of the one job;
   specifying, in a case where the history button is selected, the first file based on the setting contents corresponding to the selected history button;
   displaying, in a case where a plurality of files including the first file are stored in the folder corresponding to the obtained folder information, a list of the plurality of files including the first file on the display device; and executing a job on a basis of one or more files selected from the list of the plurality of files and of setting contents corresponding to the selected history button.

* * * * *